(12) United States Patent
Sugitatsu et al.

(10) Patent No.: US 7,158,695 B2
(45) Date of Patent: Jan. 2, 2007

(54) OPTICAL DELAY CIRCUIT, INTEGRATED OPTICAL DEVICE, AND METHOD OF MANUFACTURING INTEGRATED OPTICAL DEVICE

(75) Inventors: Atsushi Sugitatsu, Tokyo (JP); Tatsuo Hatta, Tokyo (JP); Susumu Noda, Kyoto (JP)

(73) Assignees: Mitsubishi Denki Kabushiki Kaisha, Tokyo (JP); Kyoto University, Kyoto (JP)

( * ) Notice: Subject to any disclaimer, the term of this patent is extended or adjusted under 35 U.S.C. 154(b) by 0 days.

(21) Appl. No.: 11/185,027

(22) Filed: Jul. 20, 2005

(65) Prior Publication Data

US 2006/0018594 A1 Jan. 26, 2006

(30) Foreign Application Priority Data

Jul. 23, 2004 (JP) ............................. 2004-215648

(51) Int. Cl.
*G02B 6/12* (2006.01)
*H01L 21/00* (2006.01)
*H04J 14/02* (2006.01)

(52) U.S. Cl. .................. 385/14; 385/129; 385/130; 385/131; 385/24; 385/141; 438/29; 438/31; 398/79; 398/82; 398/83; 398/85; 398/98; 398/101

(58) Field of Classification Search .............. 385/14, 385/122, 129, 130, 131, 132, 141, 123, 124, 385/24; 438/29, 31; 398/79, 81, 82, 83, 398/85, 98, 101
See application file for complete search history.

(56) References Cited

U.S. PATENT DOCUMENTS 5,751,466 A 5/1998 Dowling et al.
6,028,693 A 2/2000 Fork et al.
6,343,167 B1 1/2002 Scalora et al.
6,396,617 B1 5/2002 Scalora
6,947,649 B1 * 9/2005 Li et al. ...................... 385/122
2003/0002773 A1 * 1/2003 Parker et al. .................. 385/15
2003/0228096 A1 * 12/2003 Parker et al. .................. 385/27
2004/0062505 A1 4/2004 Sugitatsu et al.
2005/0018734 A1 1/2005 Sugitatsu et al.
2005/0029536 A1 2/2005 Sugitatsu et al.

FOREIGN PATENT DOCUMENTS

JP 6-53936 2/1994

OTHER PUBLICATIONS

Nakamura, Yashushi et al.; "Optical Talk Set", *Fujikura Technical Report*, vol. 96, pp. 18-22 (Apr. 1999).
Sugitatsu, A. et al.; "Room temperature operation of 2D photonic crystal slab defect-waveguide laser with optical pump", *Elec. Letters.*, vol. 39, No. 2, (Jan. 23, 2003).

(Continued)

*Primary Examiner*—Brian M. Healy
(74) *Attorney, Agent, or Firm*—Leydig, Voit & Mayer, Ltd.

(57) ABSTRACT

An optical delay circuit includes a plurality of defect waveguides arranged in parallel and including a line-shaped defect in a periodic refractive-index distribution structure of a photonic crystal. The defect waveguides include a multiplexing/demultiplexing portion in which the defect waveguides are arranged close to each other to multiplex and demultiplex light; and an optical delay portion extending from the multiplexing/demultiplexing portion, in which the defect waveguides are arranged with a predetermined distance therebetween so that light propagating in any of the defect waveguides does not interfere with light propagating in the other defect waveguides. Each of the waveguides has a different configuration.

26 Claims, 15 Drawing Sheets

OTHER PUBLICATIONS

Swanson, Eric A. et al.; "High Sensitivity Optically Preamplified Direct Detection DPSK Receiver with Active Delay-Line Stabilization", *IEEE Photonics Tech. Letters*, vol. 6, No. 2, pp. 263-265 (Feb. 1994).

Beling, A. et al.; "Monolithically integrated balanced photodetector and its application in OTDM 160 Gbit/s DPSK transmission", *Elec. Letters*, vol. 39, No. 16, (Aug. 7, 2003).

* cited by examiner

OPTICAL DELAY CIRCUIT, INTEGRATED OPTICAL DEVICE, AND METHOD OF MANUFACTURING INTEGRATED OPTICAL DEVICE

BACKGROUND OF THE INVENTION

1) Field of the Invention

The present invention relates to a technology for obtaining an optical delay circuit having a compact size and stabilization against an environmental variation with an easy control, and an integrated optical device using the optical delay circuit.

2) Description of the Related Art

Conventionally, an optical signal time-division-multiplexed transmission system using an optical delay line has been proposed to increase a transmission capacity of the optical signal time-division-multiplexed transmission (see, for example, Japanese Patent Application Laid-Open Publication No. H6-53936). FIG. 19 is a schematic of a conventional optical signal time-division-multiplexed transmission system using the optical delay line. On a transmission side, n-channels of electrical signals are simultaneously input to an electrical-optical conversion circuit 111 in parallel to generate an n-channel optical signal. The n-channel optical signals are simultaneously input to n lines of optical delay line group 112 and an optical multiplexer 113 in parallel. The optical delay line group 112 has delay amounts sequentially different by a reference delay time corresponding to a time width of a time slot of each of the channels in a time division multiplexing. The optical multiplexer 113 multiplexes an output optical signal from each of the optical delay lines. Then, a time-series optical signal constituted with the n-channel optical signals delayed by the reference delay time is output to an optical transmission line 104 as a multiplexed output.

On a reception side, an optical demultiplexer 115 demultiplexes the n-channel time-series optical signal input from the optical transmission line 104 to n channels of optical signals. The n channels of the optical signals demultiplexed are simultaneously input to n lines of optical delay line group 116 in parallel. Then, output optical signals from the optical delay line group 116 are converted into n-channels of electrical signals by an optical-electrical conversion circuit 117.

The optical delay lines (112, 116) used in the optical signal time-division-multiplexed transmission system described in Japanese Patent Application Laid-Open Publication No. H6-53936 is configured using an optical fiber. With this conventional optical delay lines (112, 116), to generate a 1-bit delay Δt (=25 pico seconds (ps)) in transmission and reception of an optical signal of 40 gigabits per second (Gbps) between two split optical fibers, for example, it is necessary to provide a difference between optical fiber lengths by $\Delta t \times c/n = 25 \text{ [ps]} \times 3 \times 10^{18}$ [meter (m)/second (sec)]/1.5≈5 [millimeter (mm)].

This type of optical delay line is also used to form a Mach-Zender interferometer. FIG. 20 is a schematic diagram for illustrating a conventional differential-phase-shift-keying (DPSK) reception device. As shown in FIG. 20, the DPSK reception device 150 includes a Mach-Zender interferometer 130 and a photodetector module 140 that are connected via an external optical fiber 151. The Mach-Zender interferometer 130 includes 1-bit delay line including two of multiplexer/demultiplexer 131 and an optical fiber 132. The photodetector module 140 includes two of photodetector 141. Thus, a time-delay optical circuit is formed (see, for example, Japanese Patent Application Laid-Open Publication No. H6-53936).

However, a device in which the optical delay circuit, which includes the conventional optical delay line, is provided becomes bulky, resulting in difficulty in handling the device because the optical delay line is required to be configured in such a manner that optical fibers have differences in length therebetween. Furthermore, to stabilize a temperature of the optical delay circuit, a large-capacity temperature controlling mechanism is necessary, and this makes the optical delay circuit to be installed in a small device.

In addition, with the DPSK reception device described in E. A. Swanson, et al., "High Sensitivity Optically Preamplified Direct Detection DPSK Receiver with Active Delay-Line Stabilization", IEEE Photonics Technology Letters, 1994, 6, p. 263, because the optical fiber to connect with the Mach-Zender interferometer is externally attached to the photodetector, it causes a handling problem. Moreover, to stabilize a temperature of the DPSK reception device, a temperature control of the whole DPSK reception device is required, which results in a difficulty in downsizing the device. Besides, a combination of the device and the optical fiber leads to increased cost.

SUMMARY OF THE INVENTION

It is an object of the present invention to at least solve the problems in the conventional technology.

An optical delay circuit according to one aspect of the present invention includes a plurality of defect waveguides arranged in parallel being formed by a line-shaped defect introduced to a periodic refractive-index distribution structure of a photonic crystal. The defect waveguides include a multiplexing/demultiplexing portion in which the defect waveguides are arranged with a close distance therebetween, to multiplex and demultiplex a light; and an optical delay portion extending from the multiplexing/demultiplexing portion, in which the defect waveguides are arranged with a predetermined distance therebetween so that lights propagating the defect waveguides do not interfere each other, and each of the waveguides has different configuration.

An integrated optical device according to another aspect of the present invention includes an optical delay circuit having a plurality of defect waveguides arranged in parallel, the defect waveguides being formed by a line-shaped defect introduced to a periodic refractive-index distribution structure of a photonic crystal; a delay interfering unit including a multiplexing/demultiplexing unit that multiplexes optical signals having a delay and that demultiplexes an interference wave obtained when the optical signals are multiplexed; and an optical detecting unit. The defect waveguides includes a multiplexing/demultiplexing portion in which the defect waveguides are arranged with a close distance therebetween, to multiplex and demultiplex a light; and an optical delay portion extending from the multiplexing/demultiplexing portion, in which the defect waveguides are arranged with a predetermined distance therebetween so that lights propagating the defect waveguides do not interfere each other, each of the waveguides having different configuration, the optical delay portion formed in such a manner that 1-bit optical delay is generated between two of the defect waveguides. The optical detecting unit includes a waveguide that is connected to the defect waveguides of the delay interfering unit and that propagates a light from the defect waveguides; and a photodetector that detects the light propagated.

A method of manufacturing an integrated optical device according to still another aspect of the present invention is for manufacturing an integrated optical device having a plurality of defect waveguides, a delay unit, and an optical detecting unit, the defect waveguides being formed by a line-shaped defect introduced to a periodic refractive-index distribution structure of a photonic crystal and arranged in parallel, the delay unit including a multiplexing/demultiplexing unit on the defect waveguides, the optical detecting unit including a photodetector that is connected to the defect waveguide and detects a light from the defect waveguide. The method includes forming a portion with a material having a high resistance to an etching process on a boundary between an area in which the delay unit is formed and an area in which the optical detecting unit is formed on a substrate that is formed with a material easy to be etched; forming the delay unit and the optical detecting unit on the substrate in an integrated manner; and removing a part of the substrate located under the delay unit by the etching process.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be explained in detail below with reference to the accompanying drawings.

Figure 1:
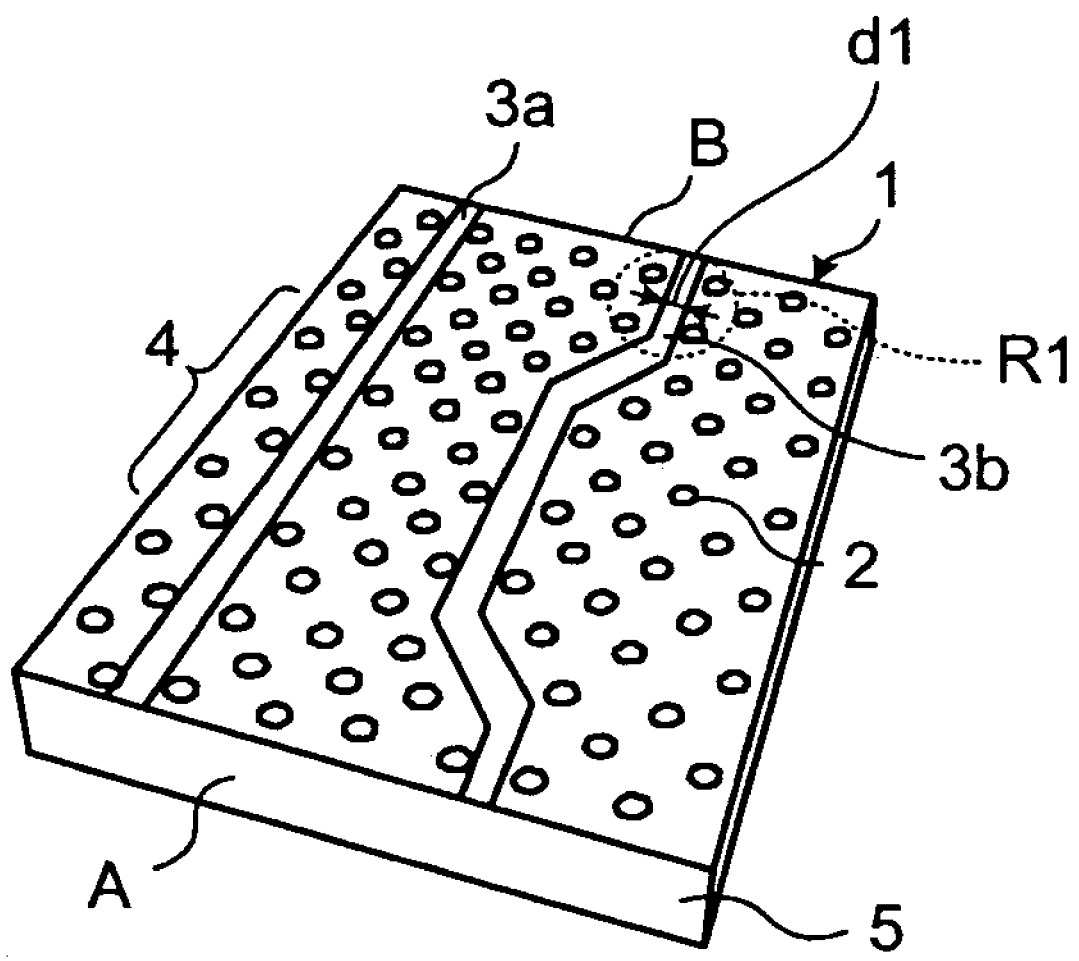
FIG. 1 is a perspective view of an optical delay circuit according to a first embodiment of the present invention.

FIG. 1 is a perspective view of an optical delay circuit according to a first embodiment of the present invention. The optical delay circuit 1 is made by introducing a plurality of line-shaped defects having different widths with respect to a periodic refractive-index distribution structure in a photonic crystal structure with the periodic refractive-index distribution structure formed on a substrate (not shown). In an example shown in FIG. 1, a plurality of air holes 2 is formed as the periodic refractive-index distribution structure. The line-shaped defects become waveguides 3a and 3b for a laser light. Because the waveguides 3a and 3b are formed by the defects with respect to the periodic refractive-index distribution structure, they are also referred to as defect waveguides. In the example shown in FIG. 1, two of the defect waveguides 3a and 3b are formed in the optical delay circuit 1 having the periodic refractive-index distribution structure. One of the defect waveguides 3a is obtained by breaking the periodic refractive-index distribution structure in a line shape, while the defect waveguide 3b is obtained by breaking the periodic refractive-index distribution structure with a different width to make a predetermined optical length difference with the defect waveguide 3a, which is line-shaped. The defect waveguide 3b is disposed in substantially parallel with the defect waveguide 3a. On the defect waveguides 3a and 3b, a coupler 4 is formed to split an optical signal input from the outside. The part of the defect waveguides 3a and 3b disposed in parallel with a different width in a range of the coupler 4 is corresponding to an optical delay unit according to the present invention.

An explanation will be given here with an example in which the optical delay circuit has a two-dimensional slab photonic crystal structure (thin-film slab structure) as the photonic crystal structure. A slab layer 5 having a thickness of a sub-micron order is formed by sequentially depositing a lower cladding layer having a refractive index lower than a refractive index of a core layer, the core layer, and an upper cladding layer having a refractive index lower than the refractive index of the core layer. The optical delay circuit having the two-dimensional slab photonic crystal structure includes a periodic refractive-index distribution structure in such a manner that the periodic refractive-index distribution structure is formed on a two-dimensional surface of the slab layer 5, passing through the slab layer 5 in a direction of the deposition. Subsequently, the defect waveguides 3a and 3b are formed by a defect with respect to the two-dimensional periodic structure. The periodic refractive-index distribution structure is formed by, for example, a triangle-lattice periodic hole structure obtained by arranging a plurality of air holes 2 in a triangle-lattice shape. This kind of the slab layer 5 can be made by using a compound semiconductor material.

Figure 2A:
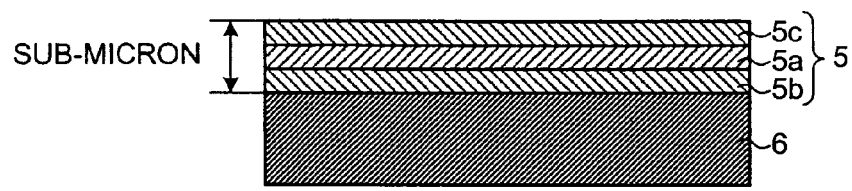
FIGS. 2A to 2E are schematics for explaining a method of manufacturing an optical delay circuit having a two-dimensional slab photonic crystal structure.

FIGS. 2A to 2E are schematics for explaining a method of manufacturing the optical delay circuit having the two-dimensional slab photonic crystal structure. As shown in FIG. 2A, the slab layer 5 having a lower cladding layer 5b, a core layer 5a, and an upper cladding layer 5c is formed on a substrate 6 by an epitaxial growth using a crystal growth equipment, such as a metal-organic chemical vapor deposition and a molecular beam epitaxy.

Figure 2B:
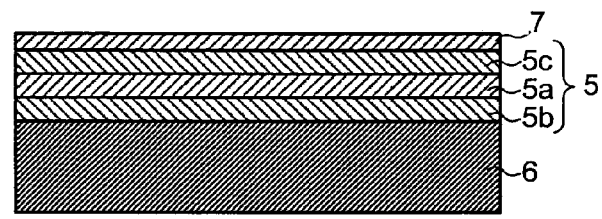
Figure 2C:
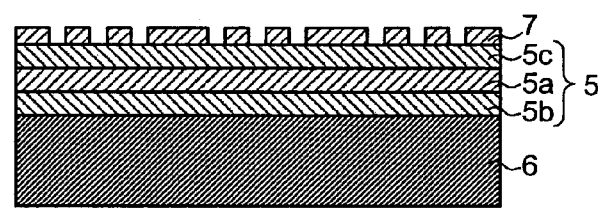

A resist 7 for an electron-beam (EB) exposure made of an organic material is applied on the upper cladding layer 5c by the epitaxial growth at the above process, as shown in FIG. 2B. After that, as shown in FIG. 2C, a pattern for forming a two-dimensional periodic air hole structure including a line-shaped defect structure is drawn by an EB exposing equipment to remove the resist 7 for the EB exposure on an area in which the two-dimensional periodic air hole structure is formed, while leaving the resist 7 for the EB exposure outside the area.

Figure 2D:
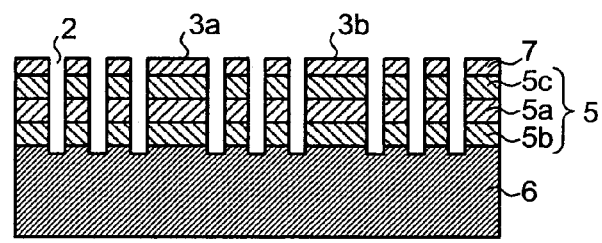

The pattern is etched from the upper cladding layer 5c up to an upper part of the substrate 6 through the lower cladding layer 5b to form the air hole structure using an etching equipment, such as a reactive-ion-etching equipment and an induced-coupled-plasma-etching equipment, as shown in FIG. 2D. After that, the resist 7 for the EB exposure applied on a non-etching area is removed.

Figure 2E:
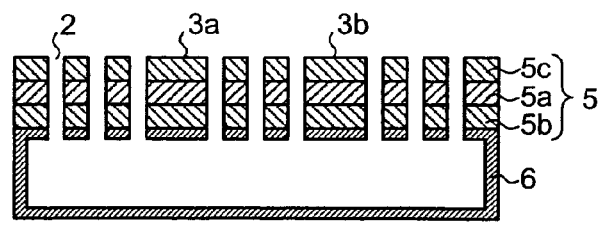

Subsequently, as shown in FIG. 2E, the optical delay circuit having a two-dimensional periodic air-hole structure is obtained by selectively removing a part of the substrate 6 under the two-dimensional periodic air-hole structure. At this moment, the inside of the substrate 6 becomes hollow, making a structure in which an edge of the slab layer 5 in a sheet shape is supported by the substrate 6. For this reason, the optical delay circuit is shown without the substrate part in FIG. 1. By adopting this type of structure, both an upper surface and a lower surface of the slab layer make a contact with the air, making it possible to confine a light by a refractive-index difference between the compound semiconductor material constituting the slab layer and the air.

Figure 3:
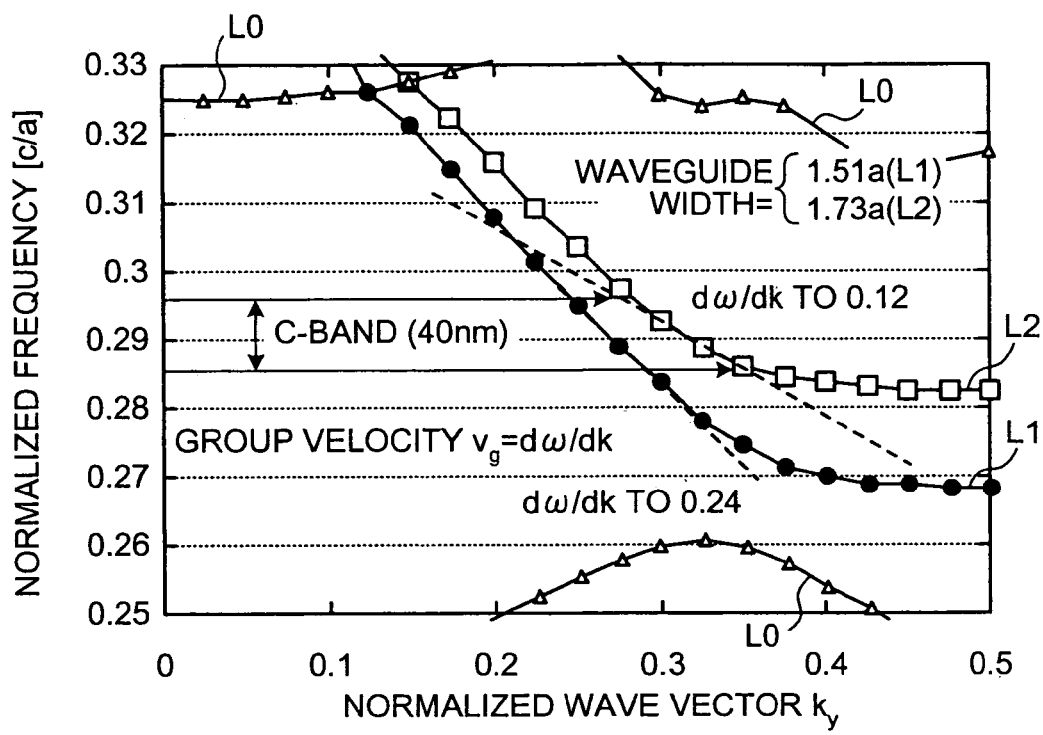
FIG. 3 is a graph of a normalized band structure of a defect waveguide in the two-dimensional slab photonic crystal structure.

FIG. 3 is a graph of a normalized band structure of a defect waveguide in the two-dimensional slab photonic crystal structure. The horizontal axis indicates a normalized wave vector, and the vertical axis indicates a normalized frequency of the light. In this band diagram, a curved line L0 formed by connecting triangle symbols indicates a mode corresponding to the triangle-lattice hole structure. Because there is no mode in a space between the curved lines L0 on the top and the bottom of the band diagram, the space becomes a frequency band where a light can hardly exist, i.e., a photonic band gap. At this moment, in the two-dimensional slab photonic crystal obtained by forming the triangle-lattice hole structure in the slab layer 5, forming the defect waveguide 3a by removing one column of the air hole structure (breaking the periodic air hole structure in a line shape) generates a waveguide mode, such as a curved line L1 formed by connecting solid circle symbols. A slope $d\omega/dk$ of the curved line L1 in a range of the normalized wave vector ky between 0.15 and 0.325 is nearly 0.24 (the value of $d\omega/dk$ is normalized by the light velocity c). Because the slope of a curved line indicating a waveguide mode represents a group velocity of a light in a band diagram, the group velocity in the above range of the normalized wave vector ky is 0.24.

On the other hand, it is possible to change the waveguide mode by setting the triangle-lattice periodic hole structure outside the defect waveguide 3a and a lattice period a to predetermined values and changing a width of the defect waveguide only. For example, a width of a line defect waveguide (a width of the defect waveguide 3a) is $3^{1/2} \cdot a$ because the triangle lattice period is a. However, when the width of the line defect waveguide (the width of the defect waveguide 3a) is changed to $1.51 \cdot a$, the waveguide mode becomes a curved line L2 formed by connecting square symbols. Focusing on a range of the normalized frequency between 0.286 and 0.296, the group velocity of the waveguide mode indicated by the curved line L2 is about 0.12, which is quite slow compared to the group velocity the waveguide mode indicated by the curved line L1 0.24.

Figure 4:
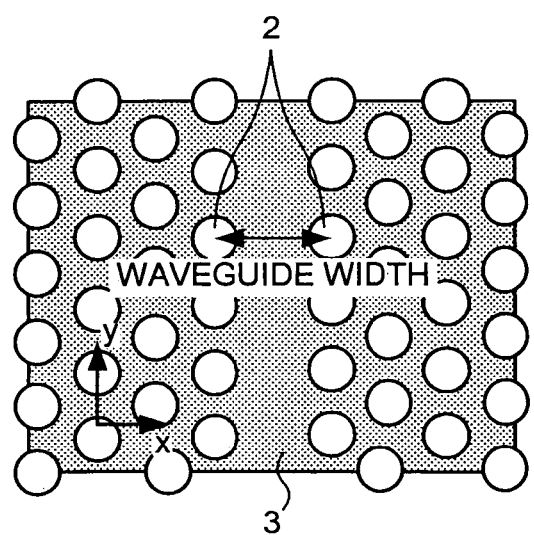
FIG. 4 is a schematic of the optical delay circuit in which a triangle lattice periodic hole is structured on a layer.

In the above explanation, a longitudinal direction of the line-shaped defect waveguide 3 is set to a direction y, and a direction perpendicular to the direction y is set to a direction x, on a plane on which the triangle-lattice periodic hole structure is formed on the optical delay circuit, as shown in FIG. 4. FIG. 4 is a schematic of the optical delay circuit in which a triangle lattice periodic hole is structured on a layer. A width of the line-shaped defect waveguide is defined as a distance between centers of the air holes 2 formed close to both sides of the defect waveguide 3 in the direction x. Although a width of the defect waveguide 3b having a bending portion is different according to a position, as shown in FIG. 1, the width of the line-shaped defect waveguide in this case is a width of a portion having the narrowest value in the defect. A light that can exist in a waveguide having a narrow width can exist in a waveguide having wider width. However, in some cases, a part of a light that can exist in a waveguide having a wide width cannot exist in a waveguide having a narrower width.

As explained above, a speed of an optical signal can be changed between the defect waveguides 3a and 3b by placing a slight difference between the widths of the two line-shaped defect waveguides. In other words, by forming the defect waveguides 3a and 3b having different widths in parallel, it is possible to change the group velocity of the optical signal propagating through each of the defect waveguides 3a and 3b. As a result, an optical delay line can be built by using the photonic crystal.

A coupling optical system, such as an optical fiber, that transmits, for example, a time-division-multiplexed optical signal is connected to a facet A of the optical delay circuit 1. When an optical signal from the optical fiber is input to the defect waveguide 3a or the defect waveguide 3b, the optical signal is split by the coupler 4. Each of the optical signals split is input to a corresponding one of the defect waveguides 3a and 3b. In the defect waveguides 3a and 3b, the optical signal is propagated at a group velocity determined by the width of each of the defect waveguides. For example, when demultiplexing a time-division-multiplexed optical signal, the width of the defect waveguide is changed in such a manner that an amount of the delay by a time corresponding to a time width of a time slot of each of the optical signals. In other words, the width of the defect waveguide is changed in such a manner that the amount of the delay between optical signals becomes zero, so that optical signals having a preset amount of the delay are output from the defect waveguides 3a and 3b on a facet B of the optical delay circuit 1. Although a case in which a time-division-multiplexed optical signal is demultiplexed is explained in the above example, when carrying out a time division multiplexing of optical signals input, the widths of the defect waveguides 3a and 3b are set in such a manner that a delay is generated by a time corresponding to a time width of a time slot between each of the optical signals. Then, by inputting each of the optical signals to the facet B, a time-division-multiplexed optical signal is output from the facet A.

When the triangle lattice period a of the two-dimensional photonic crystal shown in FIG. 1 is set to 0.453 micrometers (μm), the band of the normalized frequency between 0.286 and 0.296) corresponds to a wavelength band between 1.530 μm and 1.584 μm, which falls on a C-band in the optical communications. In other words, this optical delay circuit can be applied in the C-band in a single uniform way in the optical communications. For example, a design of the optical delay circuit that generates 1-bit delay (a time delay of 25 ps) between optical signals of 40 Gbps split into two can be realized by forming the line-shaped defect waveguides in parallel, with a length of (v1.73a−v1.51a)×c×25 [ps]≈0.9 [mm], using a time delay between the two line-shaped defect waveguides corresponding to the waveguide modes L1 and L2. The optical delay circuit according to the present invention can be realized with a length that is 1/5 of the length of the optical delay line using the conventional fiber disclosed in Japanese Patent Application Laid-Open Publication No. H6-53936. In addition, the length can be even shorter when using a high-speed optical signal over 40 Gbps.

By adopting the 1-bit optical delay photonic crystal as the optical delay circuit as each of waveguides for a Mach-Zender interferometer, a photonic-crystal slab waveguide circuit having a Mach-Zender interferometer of 1-bit optical delay function can be manufactured.

Furthermore, by combining an optical detecting unit having two photodetectors with the Mach-Zender interferometer of 1-bit optical delay function, it is possible to build an integrated optical device as a DPSK reception device in a compact size.

According to the first embodiment, because an optical delay circuit is built by a photonic crystal in which line-shaped defect waveguides having different widths, it is possible to realize a desired optical delay in a compact size. The compact size of the optical delay circuit 1 also offers an easy handling and easy temperature stabilization.

In the first embodiment, an example in which the photonic crystal structure is a two-dimensional slab photonic crystal is explained. The optical delay circuit 1 is formed on a substrate. The two-dimensional periodic air-hole structure is formed on a surface of the thin-film slab layer 5. To remove the substrate from the air hole 2, the substrate having the two-dimensional slab photonic crystal structure is put into an etchant to carry out an etching process to remove a part of the substrate located under the slab layer 5. As a result, a center of the substrate except for surrounding edges is removed to make a hollow in the optical delay circuit 1, to make a structure in which only edges of a thin film is supported by the substrate.

Figure 5:
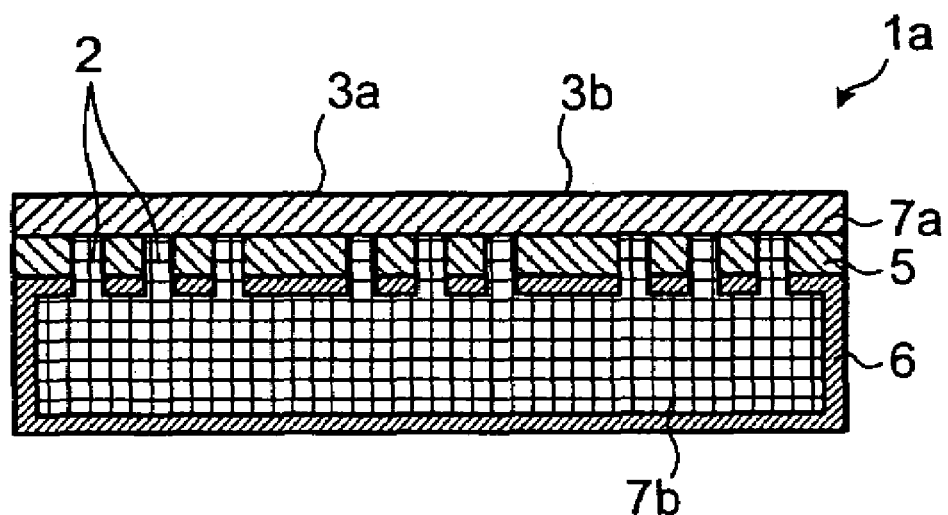
FIG. 5 is a cross section of an optical delay circuit according to a second embodiment of the present invention.

With this type of sheet-shaped structure, it becomes weak against an impact. For this reason, the slab layer 5 can be sandwiched from a top portion and a bottom portion of the slab layer 5 by a dielectric material having a refractive index lower than that of the slab layer 5, such as a polymer. FIG. 5 is a cross section of an optical delay circuit according to a second embodiment of the present invention. An optical delay circuit 1a includes dielectric layers 7a and 7b in a hollow portion in which a part of the substrate 6 located under the slab layer 5 is removed and on the top of the slab layer 5 in the optical delay circuit 1 according to the first embodiment.

For example, when sandwiching the slab layer 5 using a polymer as the dielectric layers 7a and 7b, the dielectric layers 7a and 7b can be formed by carrying out a thermal treatment after injecting a liquid polymer into a bottom portion of the slab layer 5 through a hole (not shown) or the air hole 2 and applying the polymer on the slab layer 5 by a spin coating. With this mechanism, it is possible to enhance a mechanical strength of the sheet-shaped optical delay circuit 1a. In addition, because a refractive index of the dielectric layers 7a and 7b is lower than that of the slab layer 5, it is possible to confine the light propagating in the slab layer 5.

According to the second embodiment, because the slab layer 5 is sandwiched by the dielectric layers 7a and 7b in the two-dimensional photonic crystal structure, the mechanical strength of the optical delay circuit 1a can be enhanced enough, and as a result, the optical delay circuit 1a having a resistance against an external impact can be obtained. In particular, when the two-dimensional photonic crystal is made of a compound semiconductor and the dielectric layers 7a and 7b are formed with the polymer, the light confinement in the slab layer 5 in the vertical direction is enhanced by the refractive index difference between the compound semiconductor and the polymer. As a result, it is possible to build a structure with a small light leakage.

According to the first and the second embodiments, the optical delay circuit has the two-dimensional slab photonic crystal structure, i.e., a thick of sub-micron unit. For example, according to the first embodiment, air layers are disposed on both the top portion and the bottom portion of the slab layer 5 of the sub-micron order; and the optical confinement of the light propagating in the slab layer 5 is achieved by the refractive index difference between the slab layer made of the compound semiconductor material and the air layer. However, the slab layer 5 itself can carry out the optical confinement by making the slab layer 5 thick.

Figure 6:
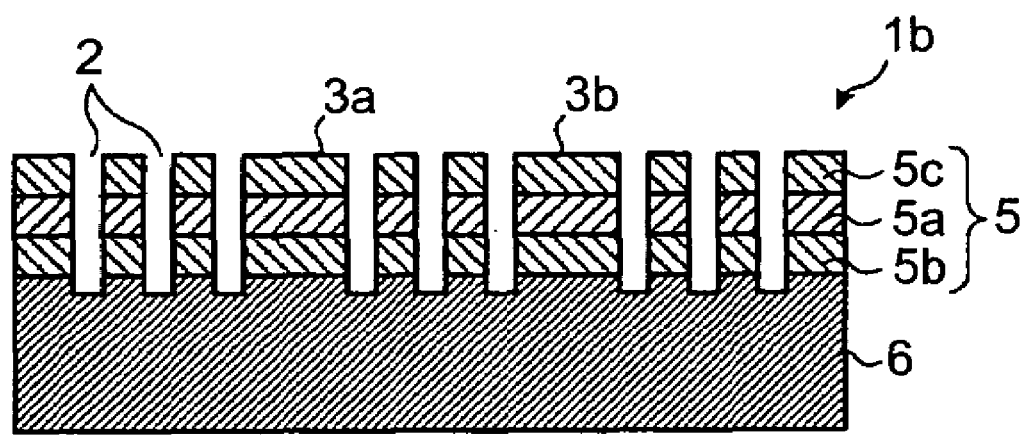
FIG. 6 is a cross section of an optical delay circuit according to a third embodiment of the present invention.

FIG. 6 is a cross section of an optical delay circuit according to a third embodiment of the present invention. As shown in the figure, an optical delay circuit 1b includes the lower cladding layer 5b, the core layer 5a that propagates a laser light, and the upper cladding layer 5c sequentially grown on the substrate 6. The lower cladding layer 5b and the upper cladding layer 5c have refractive indexes lower than that of the core layer 5a. An air hole 2 is formed periodically within a two-dimensional surface in a direction of the layer growth from the upper cladding layer 5c through the lower cladding layer 5b. The defect waveguides 3a and 3b are formed by introducing a line-shaped defect with respect to the periodic air-hole structure. A different point from the first embodiment is that a thickness from the lower cladding layer 5b to the upper cladding layer 5c is from several micrometers to several tens of micrometers. In other words, in the optical delay circuit 1b according to the third embodiment, the optical confinement of the light generated in the core layer 5a is carried out by the lower cladding layer 5b and the upper cladding layer 5c that have refractive indexes lower than that of the core layer 5a, so that the laser light propagates through the defect waveguides 3a and 3b. Furthermore, because the optical confinement is carried out by the lower cladding layer 5b and the upper cladding layer 5c, it is not necessary to remove a part of the substrate under the lower cladding layer 5b in which the periodic air-hole structure is formed. A shape of the upper surface of the optical delay circuit 1b is the same as that shown in FIG. 1 according to the first embodiment.

The core layer 5a, the lower cladding layer 5b, and the upper cladding layer 5c can be formed by using, for example, a compound semiconductor material. When $In_{(1-x)}Ga_{(x)}As_{(y)}P_{(1-y)}$ is used as the compound semiconductor material, it is possible to change the refractive index by about 10% to 20% by changing x and y from 0 to 1. Therefore, it is possible to obtain the lower cladding layer 5b and the upper cladding layer 5c having a slightly different composition from the core layer 5a so that the refractive indexes of the lower cladding layer 5b and the upper cladding layer 5c become lower than that of the core layer 5a.

According to this configuration, because the lower cladding layer 5b and the upper cladding layer 5c are also formed with the compound semiconductor, by setting a ratio of the composition of the compound material, it is possible to obtain the optical confinement, even with a small relative refractive-index difference A of between the core layer 5a and the lower cladding layer 5b and the upper cladding layer 5c. Furthermore, because the compound semiconductor of this kind of composition has the same crystal structure, the fabrication of the thin film becomes easy. In addition, it is not necessary to remove the part of the substrate under the lower cladding layer 5b.

According to the third embodiment, the core layer 5a, the lower cladding layer 5b, and the upper cladding layer 5c are fabricated with the compound semiconductor materials having a similar crystal structure with a slightly different composition, it is possible to simplify the thin-film fabrication process for the optical delay circuit 1b.

As a design for the photonic crystal waveguide, a difference of the group velocities between a relatively broad photonic crystal waveguide and a narrow photonic crystal waveguide is used as an optical delay in the above embodiments. According to the above embodiments, the width of the defect waveguide of the photonic crystal having a fast group velocity (being a reference) is set to $3^{1/2} \cdot a$ by simply removing one column of the air-hole structure from the two-dimensional periodic air-hole structure. However, the width of the defect waveguide is not limited to the above value. For example, it is also possible to set a larger value to broaden both of the defect waveguides. By broadening the width of the defect waveguides, a connection with an optical transmission line, such as an external optical fiber, also becomes easy.

According to a fourth embodiment of the present invention, because the width of the defect waveguides formed on the photonic crystal can be set optionally, for example, when the width of the defect waveguides are broadened, it is possible to reduce a propagation loss of the waveguide, and form an optical delay circuit having a high coupling efficiency with an external coupling optical system.

According to the above embodiments, an optical delay circuit is implemented by designing a defect waveguide of a relatively broad width and a defect waveguide of a narrow width. However, instead of changing widths of each of the defect waveguides, it is also possible to generate an optical delay between group velocities of optical signals propagating through defect waveguides by slightly changing a lattice period of the two-dimensional air-hole structure constituting the photonic crystal structure.

Figure 7:
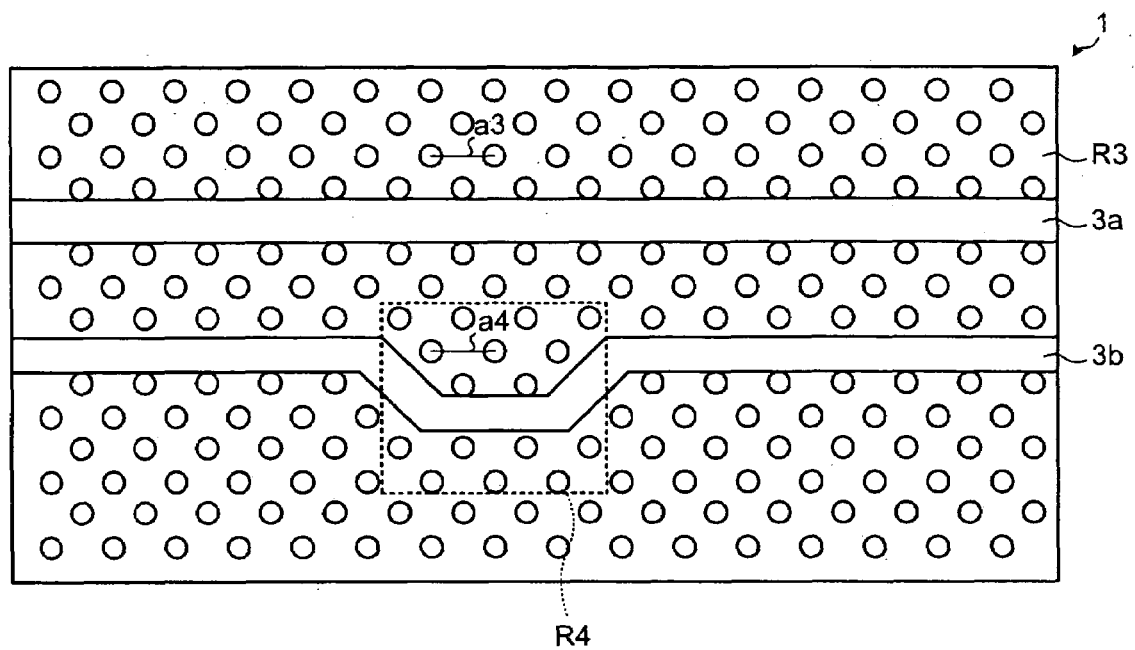
FIG. 7 is a plan view of an optical delay circuit according to a fifth embodiment of the present invention.

FIG. 7 is plan view of an optical delay circuit according to a fifth embodiment of the present invention. As shown in the figure, areas R3 and R4 in which the lattice period is slightly changed are formed on a plane of a slab layer in the two-dimensional air-hole structure of an optical delay circuit 1. In other words, when an area in which the defect waveguide 3b is farthest from the defect waveguide 3a is set to R4, and other area is set to R3, the lattice period a4 of the area R4 is different from the lattice period a3 of the area R3. In this example, the lattice period a3 is set to 0.42 μm, and the lattice period a4 is set to 0.44 μm.

Figure 8:
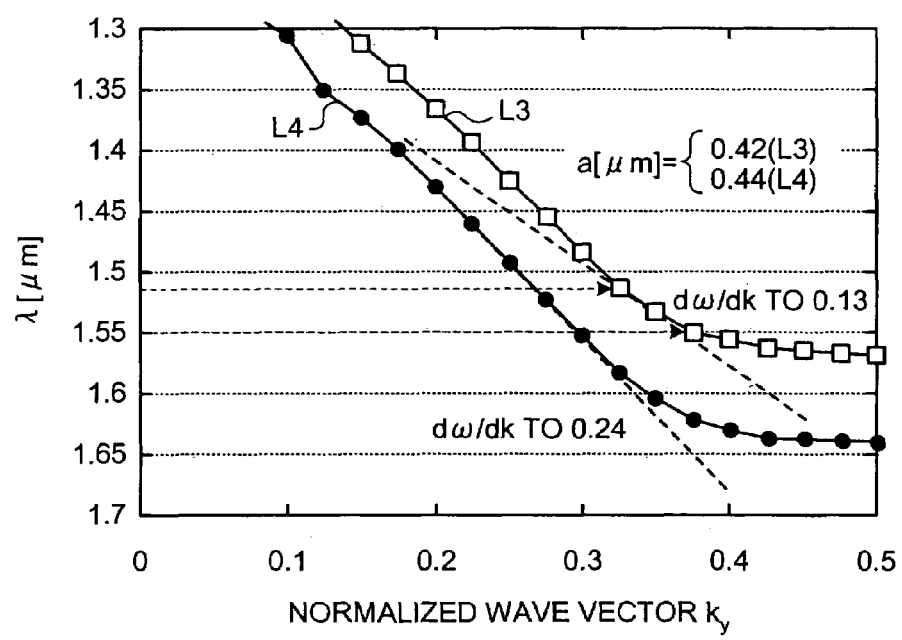
FIG. 8 is a graph of a band structure of the optical delay circuit shown in FIG. 7.

FIG. 8 is a graph of a band structure of the optical delay circuit having the two-dimensional air-hole structure shown in FIG. 7 with a slightly different lattice periods. The horizontal axis is the normalized wave vector, and the vertical axis is a wavelength of light. A curved line L3 obtained by connecting the square symbols indicates the waveguide mode when the lattice period a3 is 0.42 μm, and a curved line L4 obtained by connecting the solid circle symbols indicates the waveguide mode when the lattice period a4 is 0.44 μm.

As shown in FIG. 8, in a wavelength range between 1.51 μm and 1.55 μm in the vertical axis, the group velocity of the two-dimensional slab photonic crystal with the lattice period a≈0.44 μm (i.e., slope of the curved line L4) is dω/dk≈0.24, and the group velocity of the two-dimensional slab photonic crystal with the lattice period a≈0.42 μm (i.e., a slope of the curved line L3) is dω/dk≈0.13. Namely, in each of the waveguides formed by changing the lattice period, an optical signal of a different group velocity propagates, and as a result, it is possible to obtain the same result as the case in which the width of the waveguide is changed, as explained in the first to the fourth embodiments.

According to the fifth embodiment, because the optical delay circuit is formed with a two-dimensional slab photonic crystal in which areas having different lattice periods are arranged, it is possible to realize a desired optical delay in a compact size.

According to the first to the fourth embodiments, an optical delay circuit is realized by designing a defect waveguide of a relatively broad width and a defect waveguide of a narrow width. However, instead of changing widths of each of the defect waveguides, it is also possible to generate an optical delay between group velocities of optical signals propagating through more than one defect waveguide by slightly changing a diameter of a lattice hole of the two-dimensional periodic air-hole structure constituting the photonic crystal structure.

Figure 9:
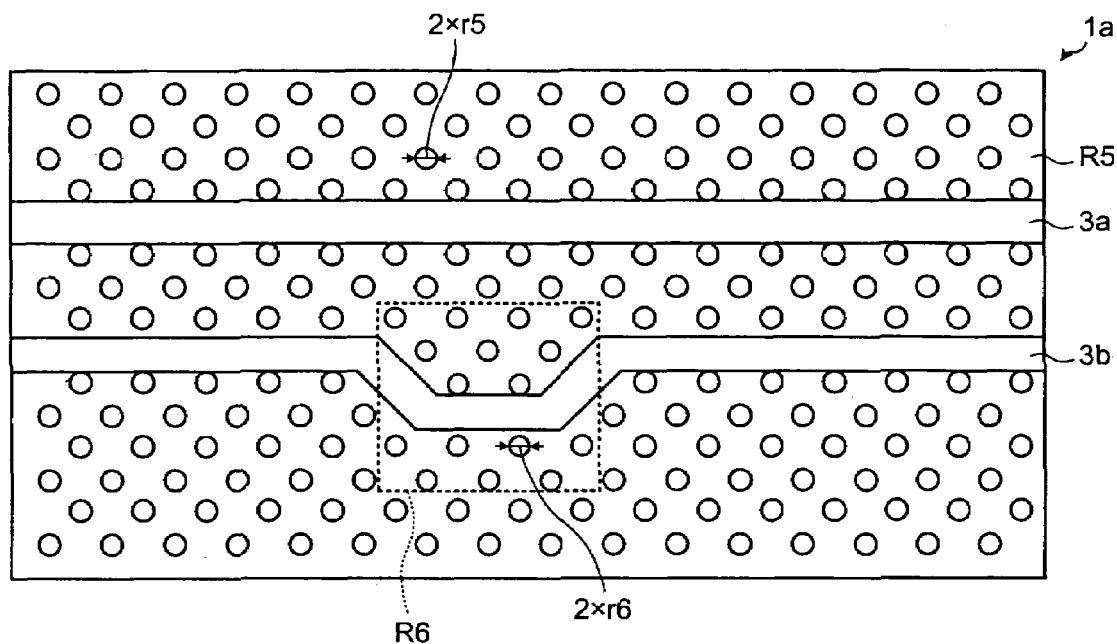
FIG. 9 is a plan view of an optical delay circuit according to a sixth embodiment of the present invention.

FIG. 9 is a plan view of an optical delay circuit according to a sixth embodiment of the present invention. As shown in the figure, areas R5 and R6 where the lattice hole diameter is slightly changed are formed on a plane of the slab layer 5 in the two-dimensional air-hole structure of the optical delay circuit 1. In other words, when an area in which the defect waveguide 3b is farthest from the defect waveguide 3a is set to R6, and other area is set to R5, the lattice hole radius r6 of the area R6 is different from the lattice hole radius r5 of the area R5. In this example, the lattice hole radiuses r5 of the area R5 is set to 0.31 a, and the lattice hole radius r6 of the area R6 is set to 0.27a.

Figure 10:
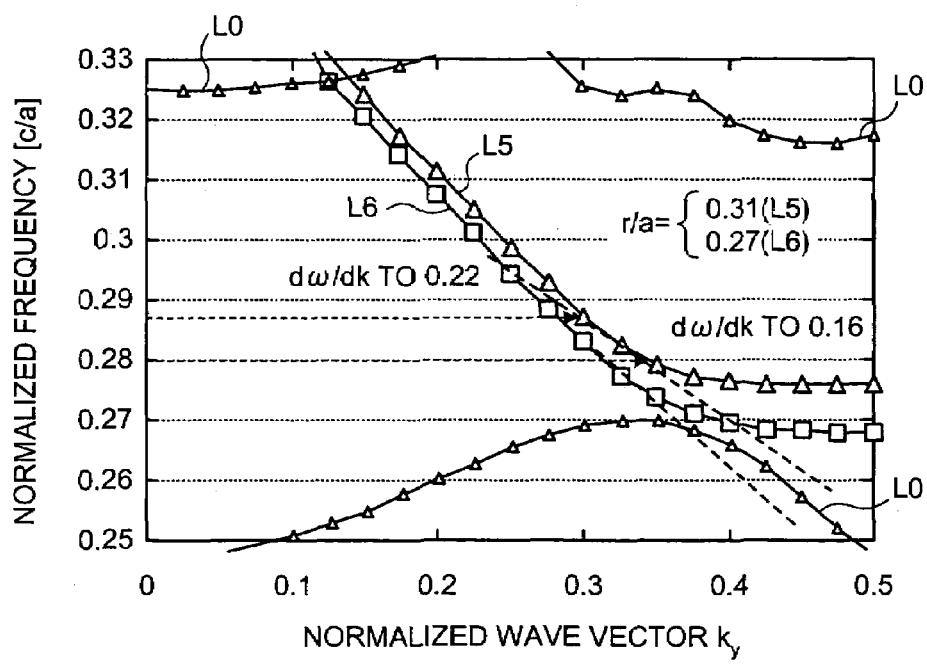
FIG. 10 is a graph of a band structure of the optical delay circuit shown in FIG. 9.

FIG. 10 is a graph of a band structure of the optical delay circuit having the two-dimensional air-hole structure shown in FIG. 9 with a slightly different lattice hole diameter. The horizontal axis is the normalized wave vector, and the vertical axis is the normalized frequency. A curved line L5 obtained by connecting the square symbols indicates the waveguide mode when the lattice hole radius r5 is 0.31a, and a curved line L6 obtained by connecting the solid circle symbols indicates the waveguide mode when the lattice hole radius r6 is 0.27a.

As shown in FIG. 10, in a range of the normalized frequency between 0.28 and 0.29 in the vertical axis (corresponding to a wavelength range between 1.53 μm and 1.57 μm when the lattice period is a=0.44 μm), the group velocity of the two-dimensional slab photonic crystal with the lattice hole radius r6=0.27a (i.e., slope of the curved line L6) is dω/dk≈0.22, and the group velocity of the two-dimensional slab photonic crystal with the lattice hole radius r5=0.31a (i.e., slope of the curved line L5) is dω/dk≈0.16. Namely, in each of the waveguides formed by changing the lattice hole diameter, an optical signal of a different group velocity propagates, and as a result, it is possible to obtain the same result as the case in which the width of the waveguide is changed, as explained in the first to the fourth embodiments.

According to the sixth embodiment, because the optical delay circuit is formed with a two-dimensional slab photonic crystal in which more than one area having different lattice hole diameter is arranged, it is possible to realize a desired optical delay in a compact size.

According to the first to the fourth embodiments, an optical delay circuit is realized by designing a defect waveguide of a relatively broad width and a defect waveguide of a narrow width. However, instead of changing widths of each of the defect waveguides, it is also possible to generate an optical delay between group velocities of optical signals propagating through more than one of the defect waveguide by slightly changing a composition of the compound material constituting the photonic crystal structure.

For example, when InGaAsP is used as the compound semiconductor material constituting the photonic crystal structure, it is possible to change the refractive index by about 10% to 20% by changing x and y from 0 to 1 in a composition of $In_{(1-x)}Ga_{(x)}As_{(y)}P_{(1-y)}$. In addition, when GaAs is used as the compound semiconductor material constituting the photonic crystal structure, it is possible to change the refractive index in a similar manner by changing a ratio of a composition between GaAs and a material having a similar composition and structure, such as AlGaAs. Therefore, by using this kind of material, a changing of the composition in the defect waveguide area, the cladding area, or the two-dimensional periodic air-hole structure area can change the refractive index in the photonic crystal structure. For example, by changing a composition of the defect waveguide area and a composition of the two-dimensional periodic air-hole structure area, it is possible to change the refractive index in the photonic crystal structure.

Figure 11:
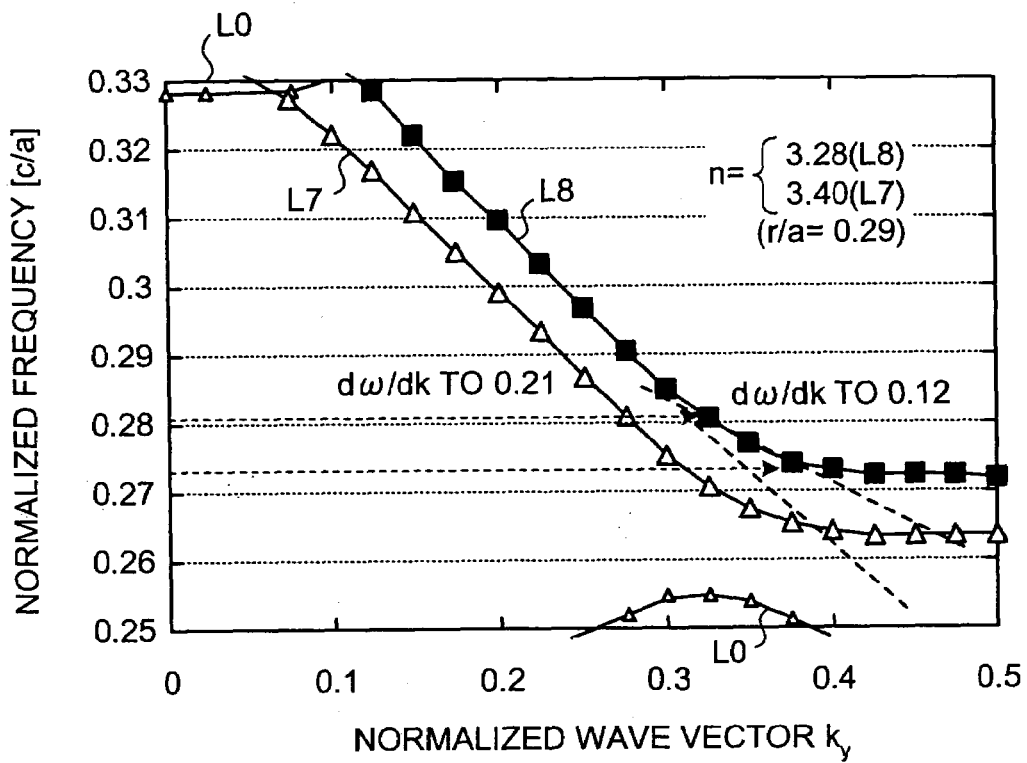
FIG. 11 is a graph of a band structure of the optical delay circuit with alteration to a composition of a waveguide area.

FIG. 11 a graph of a band structure of the optical delay circuit with alteration to a composition of a waveguide area. The horizontal axis is the normalized wave vector, and the vertical axis is the normalized frequency. A curved line L7 obtained by connecting the square symbols indicates the waveguide mode when the refractive index is n=3.40, and a curved line L8 obtained by connecting the solid circle symbols indicates the waveguide mode when the refractive index is n=3.28.

As shown in FIG. 11, in a range of the normalized frequency between 0.274 and 0.280 in the vertical axis (corresponding to a wavelength range between 1.53 μm and 1.56 μm when the lattice period is a=0.428 μm), the group velocity of the two-dimensional slab photonic crystal with the refractive index n=3.40 (i.e., slope of the curved line L7) is dω/dk≈0.21, and the group velocity of the two-dimensional slab photonic crystal with the refractive index n=3.28 (i.e., slope of the curved line L8) is dω/dk≈0.12. In other words, in a waveguide formed with different refractive indexes, an optical signal of a different group velocity propagates through the waveguide. As a result, it is possible to obtain the same result as the case in which the width of the waveguide is changed, as explained in the first to the fourth embodiments.

According to the seventh embodiment, the optical delay circuit is formed with a photonic crystal in which a composition of the compound materials constituting the waveguide is varied so that the refractive index is changed. Therefore, it is possible to realize a desired optical delay in a compact size.

According to the first to the fourth embodiments, an optical delay circuit is realized by designing a defect waveguide of a relatively broad width and a defect waveguide of a narrow width. However, instead of changing widths of each of the defect waveguides, it is also possible to generate an optical delay between group velocities of optical signals propagating through more than one of the defect waveguide by inserting a spot defect near or in the middle of the defect waveguides.

Figure 12:
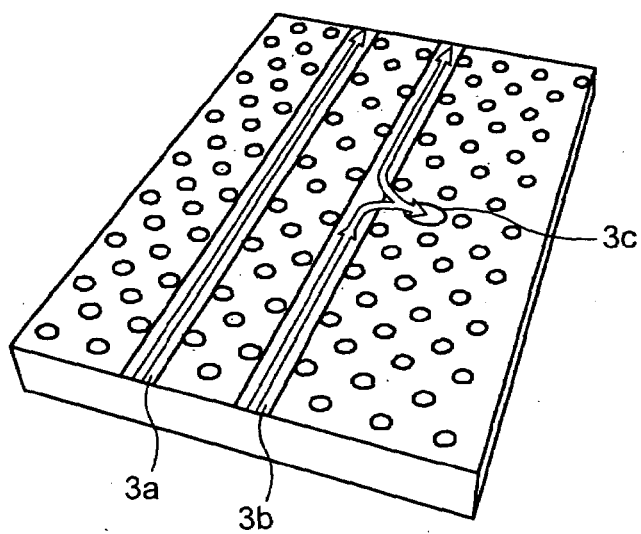
FIG. 12 is a perspective view of an optical delay circuit according to an eighth embodiment of the present invention.

FIG. 12 is a perspective view of an optical delay circuit according to an eighth embodiment of the present invention. The figure shows an optical delay circuit in which a spot defect 3c obtained by changing an air-hole structure to an elliptical shape is formed near a middle of the defect waveguide 3b in a longitudinal direction from among two line-shaped defect waveguides 3a and 3b. The spot defect 3c has a resonance mode. The light propagating through the defect waveguide 3b is trapped in the spot defect 3c, and released to the defect waveguide 3b again after a predetermined time has passed. With this mechanism, the light propagating through the defect waveguide 3b gains a delay by a time for being trapped in the spot defect 3c. With an acceptor defect formed by making a diameter of an air hole large, it is possible to realize a Q value (generally defined as Q≡−ω·E/(dE/dt)=ω·τ in a resonator, where 107 is an angular frequency, E is an energy accumulated in the resonator, and τ is a resonance life) of about 500; and conversely with a donor defect formed by filling in an air hole, it is possible to realize a Q value of about 50,000. With this difference, in the former case, τ=0.4 ps of the delay can be obtained, and in the latter case, τ=40 ps of the delay can be obtained. Although the spot defect 3c of the elliptical shape is shown in FIG. 12, the spot defect is not limited to this. For example, it can be any air hole of which the diameter is made small or large can be used as long as it is the spot defect 3c.

According to the eighth embodiment, because the optical delay circuit is fabricated by forming a spot defect near or in the middle of the line-shaped defect waveguide, it is possible to realize a desired optical delay in a compact size.

Figure 13:
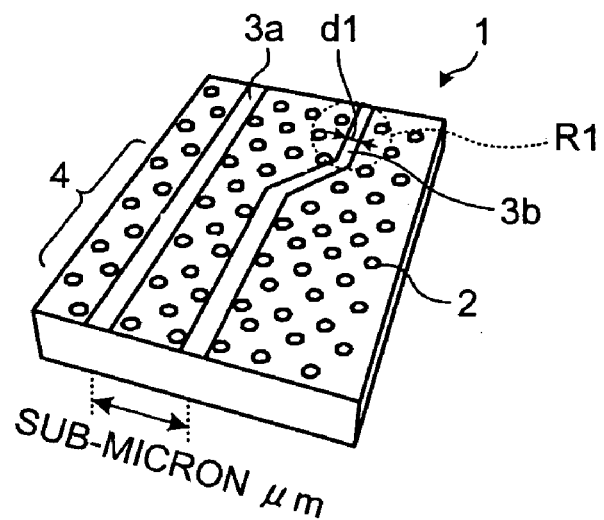
FIG. 13 is a perspective view of an optical delay circuit according to a ninth embodiment of the present invention.

FIG. 13 is a perspective view of an optical delay circuit according to a ninth embodiment of the present invention. According to the above embodiments, a distance between the two defect waveguides is not defined; however, according to the ninth embodiment, in an input portion of the defect waveguides (the width is sub-micron size) to which an optical signal is input from the outside (i.e., an area where the defect waveguides of the facet A are formed), the two defect waveguides 3a and 3b are arranged in parallel in a close distance (the distance is in sub-micron size). According to this configuration, it is possible to integrally couple a single coupling optical system from the outside to the two defect waveguides. In other words, it is possible to input a light from a single coupling optical system to the defect waveguides 3a and 3b at the same time. With this mechanism, a coupling efficiency of the light input to the defect waveguide of which the width is narrower than that of the optical fiber can be enhanced, compared to a case in which the light is separately input to each of the defect waveguides.

According to the ninth embodiment, the optical delay circuit is formed by arranging two defect waveguides in parallel in a close distance. Therefore, it is possible to use a single coupling optical system to input a light to the optical delay circuit. Furthermore, compared to a case in which a light is input to one waveguide and split thereafter, it is possible to enhance the coupling efficiency of the light. As a result, it is possible to realize an optical functional device having an optical delay circuit of a compact-size.

Figure 14:
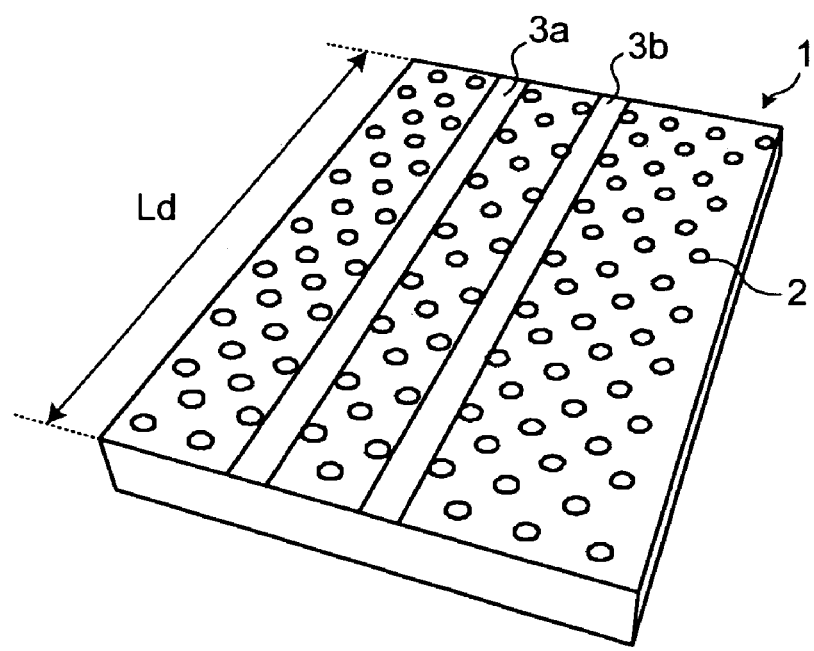
FIG. 14 is a perspective view of an optical delay circuit according to a tenth embodiment of the present invention.

FIG. 14 is a perspective view of an optical delay circuit according to a tenth embodiment of the present invention.

An optical delay circuit according to the tenth embodiment includes two line-shaped defect waveguides arranged in parallel with different widths. while in the first embodiment, as shown in FIG. 1, one of the defect waveguides is bent at a splitting portion, according to the tenth embodiment, the defect waveguides 3a and 3b in the photonic crystal are not bent to make a split portion, keeping the defect waveguides substantially in parallel. With this kind of configuration, it is possible to carry out a split of a light, a combining of lights, and re-split of a light according to a propagation length Ld based on a principle of a directional coupler. In other words, it is possible to generate a desired optical delay between optical signals propagating through the two defect waveguides 3a and 3b by setting a length of the two defect waveguides 3a and 3b formed in parallel to an appropriate value.

According to the tenth embodiment, because the optical delay circuit is fabricated by forming a plurality of line-shaped defect waveguides with different widths in parallel in a photonic crystal, it is possible to reduce a bending loss of an optical signal due to bending of the defect waveguides, and at the same time, it is possible to carry out multiplexing and demultiplexing of a light based on the principle of the directional coupler. As a result, it is possible to build an optical delay circuit in a compact-size.

According to the above embodiments, a light of a zeroth-order mode is used for the optical delay circuit. However, not only the light of the zeroth-order mode, a combination with a light of a higher-mode (first-mode) can be used to utilize the difference of the group velocity to build an optical delay circuit.

Figure 15:
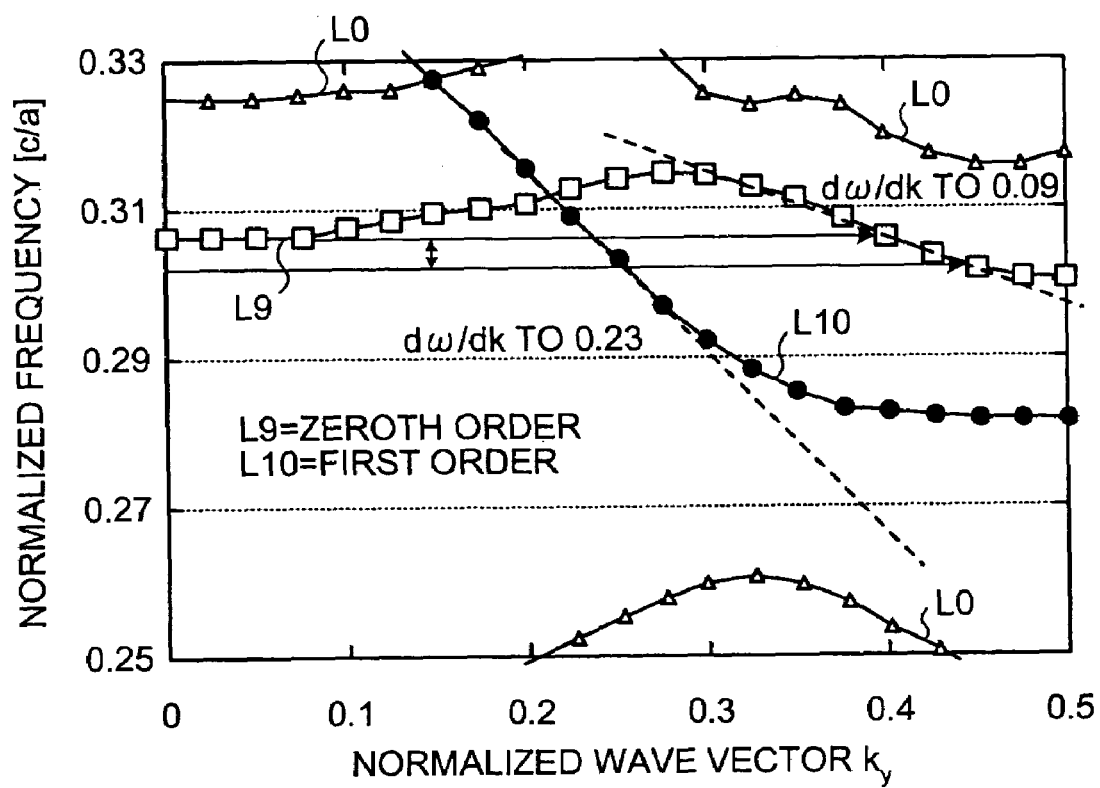
FIG. 15 is a graph of a band structure when a zeroth-order waveguide mode and a first-order waveguide mode are inserted in a photonic band gap.

FIG. 15 is a graph of a band structure when a zeroth-order waveguide mode and a first-order waveguide mode are inserted in a photonic band gap according to an eleventh embodiment of the present invention. The horizontal axis is the normalized wave vector, and the vertical axis is the normalized frequency. A curved line L9 obtained by connecting the solid circle symbols indicates the zeroth-order waveguide mode, and a curved line L10 obtained by connecting the square symbols indicates the first-order waveguide mode.

As shown in FIG. 15, in a range of the normalized frequency between 0.302 and 0.306 in the vertical axis (corresponding to a wavelength range between 1.53 μm and 1.55 μm when the lattice period is a=0.469 μm), the group velocity at the first-order waveguide mode (i.e., a lope of the curved line L10) is $d\omega/dk \approx 0.09$, and the group velocity at the zeroth-order (i.e., a lope of the curved line L9) is $d\omega/dk \approx 0.23$. In other words, by using a plurality of different waveguide modes, an optical signal having a different group velocity propagates through each of the defect waveguides, and as a result, it is possible to obtain the same result as the case in which the width of the waveguide is changed, as explained in the first to the fourth embodiments. The zeroth-order and the first-order waveguide modes can be realized by changing a waveguide width or a structure of the waveguide in such a manner that a light of a desired waveguide mode propagates through the defect waveguide.

According to the eleventh embodiment, an optical signal having a different waveguide mode propagates through a defect waveguide of the optical delay circuit. Therefore, it is possible to realize a desired optical delay in a compact size. In addition, it is possible to utilize a difference of the group velocities in a broad bandwidth.

Furthermore, by combining different types of specifications, as described above according to the first to the eleventh embodiments (such as the lattice period, the width of the defect waveguide, the diameter of the air hole, and the composition of the compound material) for the defect waveguides, it is possible to utilize a difference of the group velocities in a broad bandwidth. Therefore, the optical delay circuit using the photonic crystal structure can be built by using the combination of different types of specifications for the defect waveguides, instead of using a single specification. In addition, both the top and the bottom of the slab layer 5 of the photonic crystal structure according to the fourth to the eleventh embodiments can be sandwiched by a dielectric material having a refractive index lower than that of the slab layer 4, as explained in the second embodiment.

Various configurations of the optical delay circuit are explained in the first to the eleventh embodiments. In what follows, an embodiment in which the optical delay circuit is applied to an integrated optical device is explained. For example, a DPSK reception device can be built by configuring the optical delay circuit 1 according to the first embodiment in such a manner that an optical signal is split into two defect waveguides to generate 1-bit delay between two optical signals split so that the two optical signals with the 1-bit delay are combined, and by adding an optical detecting unit having two photodetectors to each of the defect waveguides.

Figure 16:
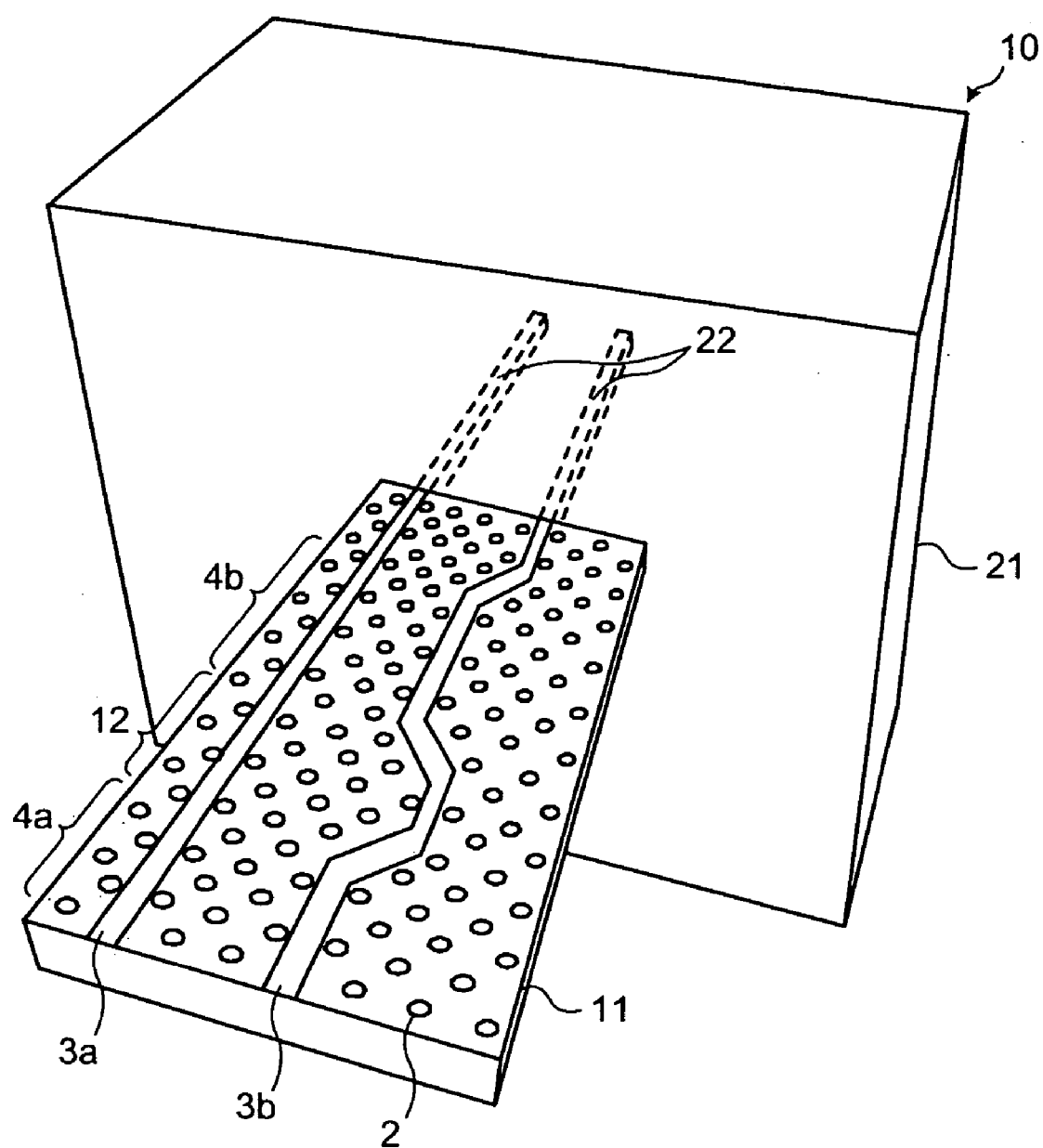
FIG. 16 is a perspective view of an integrated optical device using an optical delay circuit.

FIG. 16 is a perspective view of the integrated optical device using the optical delay circuit, according to a twelfth embodiment of the present invention. As shown in FIG. 16, an integrated optical device 10 includes a delay interfering unit 11 that split an optical signal to generate a predetermined amount of delay, and make the optical signals split interfere each other, and an optical detecting unit 21 that detects an interference wave output from the delay interfering unit 11.

The delay interfering unit 11 is formed by a photonic crystal having the defect waveguides 3a and 3b in which a line-shaped is introduced. As shown in FIG. 16, one of the defect waveguides is the line-shaped defect waveguide 3a obtained by breaking one column of the periodic air-hole structure, and the other of the defect waveguides is the defect waveguide 3b that is formed by breaking the periodic air-hole structure so that 1-bit delay is generated with respect to a light propagating through the line-shaped defect waveguide 3a, in substantially parallel in a longitudinal direction of the defect waveguide 3a. In the delay interfering unit 11, a first coupler 4a that splits an optical signal input from the outside, an optical delaying unit 12 that generates 1-bit delay between the optical signals split, and a second coupler 4b that combines the optical signals having the delay to generate an interference wave, and separates the interference wave generated. The first coupler 4a and the optical delaying unit 12 are corresponding to the optical delay circuit formed by the photonic crystal explained above according to the first to the eleventh embodiments. In the example shown in FIG. 16 illustrates a case in which the two defect waveguides 3a and 3b having different waveguide widths according to the first embodiment is used. The widths of the defect waveguides 3a and 3b are adjusted so that 1-bit delay is generated between the optical signals split at the first coupler 4a.

The optical detecting unit 21 includes a waveguide-type photodetector 22 having two waveguides that are disposed on an extension of a facet of the defect waveguides 3a and 3b of the delay interfering unit 11, and connected to the defect waveguides 3a and 3b of the delay interfering unit 11, and a photodetector disposed on each of the two waveguides. The waveguides are, for example, conventional buried-type waveguides. The pn junction of the photodetector is required to be arranged making a contact with the waveguide so that the photodetector can detect an optical signal input from the waveguides. Generally, the waveguide and the photodetector are integrally formed to make the waveguide-type photodetector 22 of the buried-type structure, as shown in FIG. 16. As a result, it is possible to simply a fabrication process. In this case, the pn junction is also formed in the waveguide portion.

According to the integrated optical device of this kind of structure, when an optical signal is input to the delay interfering unit 11, the optical signal is split into two optical signals at the first coupler 4a, and 1-bit delay is generated in the optical signals split while the optical signals propagate through the optical delaying unit 12 of the defect waveguides 3a and 3b. After that, the two optical signals are combined at the second coupler 4b, and two interference waves are generated. The interference waves are split into the two defect waveguides 3a and 3b, and output from the delay interfering unit 11. Each of the interference waves is input to the two waveguide-type photodetectors 22 of the optical detecting unit 21 from corresponding on of the defect waveguide 3a, 3b, and converted into an electrical signal. At this moment, because a single optical signal is detected as two interference waves having substantially same contents, it is possible to receive an optical signal input to the delay interfering unit 11 with an enhanced sensitivity.

Because the waveguide-type photodetectors 22 of the buried-type formed on the substrate is well known, a detailed explanation of the structure thereof is omitted. In addition, the pn junction of the photodetector can be a p-i-n junction by forming an intrinsic semiconductor layer or a non-conductive layer in a boundary of the pn junction. When the p-i-n junction is formed, it is possible to reduce a junction capacity of the photodetector, and increase a speed of a signal response.

Figure 17:
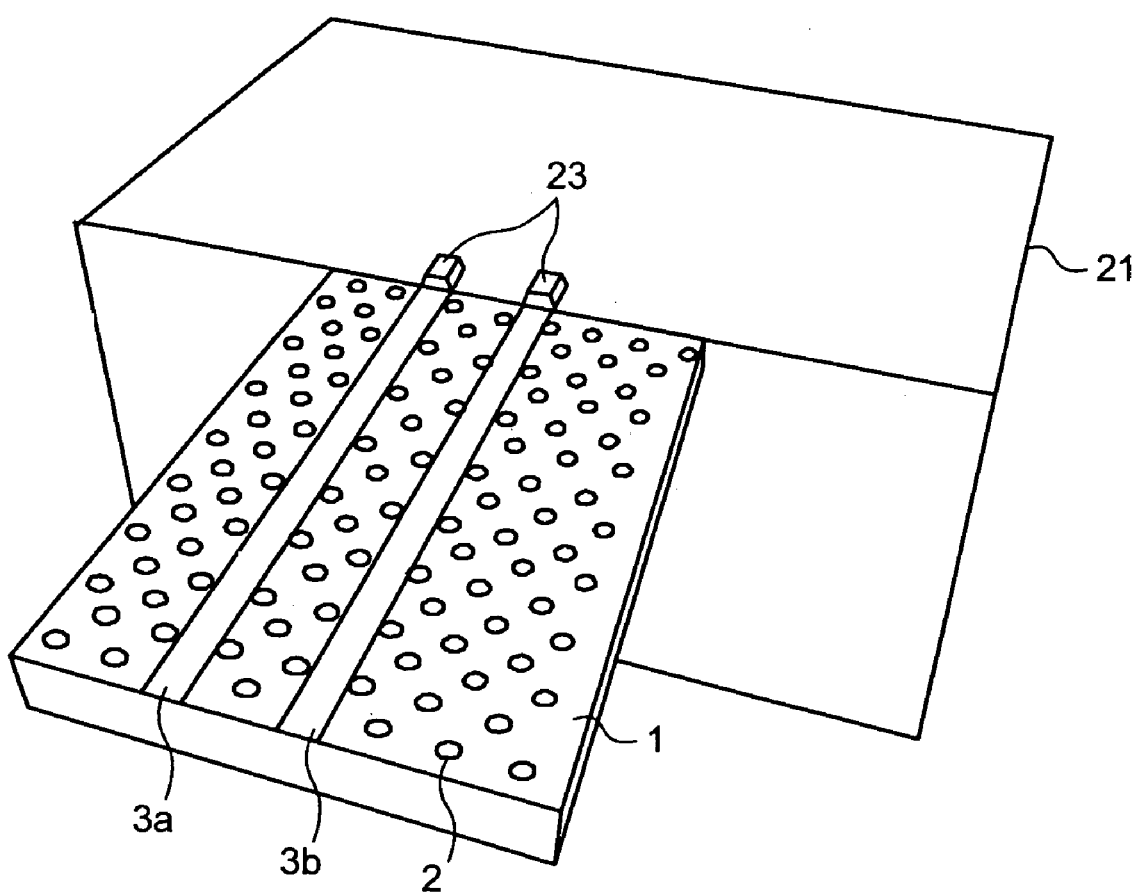
FIG. 17 is a perspective view of an integrated optical device of which an optical detecting unit is a ridge-type waveguide photodetector.

Although the delay interfering unit 11 having the structure according to the first embodiment is used in the integrated optical device in the example shown in FIG. 16, any optical delay circuit according to the first to the eleventh embodiments can be applied to the integrated optical device. Furthermore, although the photodetector of the optical detecting unit 21 has a buried-type structure in the example shown in FIG. 16, a waveguide-type photodetector 23 of a ridge-type, as shown in FIG. 17, can also be used. FIG. 17 is a perspective view of the integrated optical device of which the optical detecting unit is a ridge-type waveguide photodetector.

According to the twelfth embodiment, because the optical delaying unit 12 having the delay interfering unit 11 can be formed in a compact size, it is possible to build the integrated optical device 10 including the delay interfering unit 11 and the optical detecting unit 21 in a compact size.

In the integrated optical device according to the twelfth embodiment, it is possible to build the integrated optical device 10 integrally in a compact size by integrally forming the delay interfering unit 11 and the optical detecting unit 21 having a plurality of photodetectors. In the integrated optical device 10, because the delay interfering unit 11 and the optical detecting unit 21 can be built with the same semiconductor material, it is possible to integrally form the delay interfering unit 11 and the optical detecting unit 21 on the same substrate. For example, both the delay interfering unit 11 having the two-dimensional photonic crystal structure and the optical detecting unit of the buried-type of the ridge type include the lower cladding layer, the core layer, and the upper cladding layer deposited on the substrate. Therefore, by forming the waveguide structure of the optical detecting unit 21 on the extension of the defect waveguides 3a and 3b of the delay interfering unit 11, it is possible to carry out a bonding of the waveguide portions of the both with a high precision. At this moment, the photodetector is formed on another facet of the buried-type waveguide or the ridge-type waveguide.

FIGS. 18A to 18G are schematics for explaining a method of manufacturing the integrated optical device that is integrally formed. In this example, InP is used as the substrate, and InGaAsP is used as the material for the optical delay circuit 1 and the optical detecting unit 21. The figures illustrate cross sections of the delay interfering unit 11 and the optical detecting unit 21 in the lateral direction.

Figure 18:
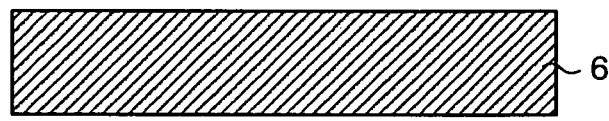
FIGS. 18A to 18G are schematics for explaining a method of manufacturing the integrated optical device that is integrally formed.
Figure 18:
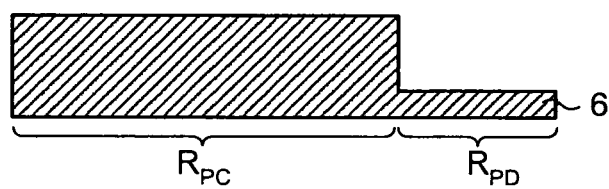
Figure 18:
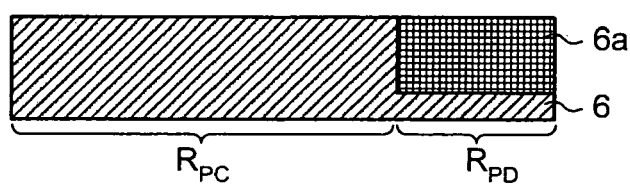
Figure 18:
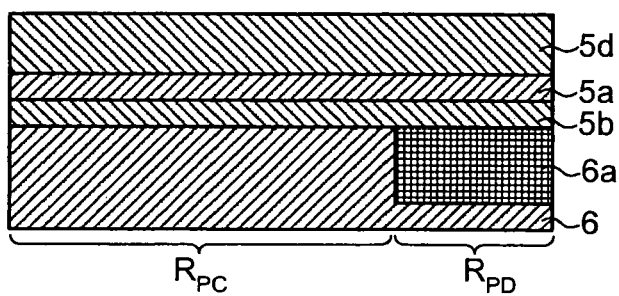

First, an area of the substrate shown in FIG. 18A at which the optical detecting unit is formed (hereinafter, "optical-detecting-unit forming area") $R_{PD}$ is etched to form a step on the cross section of the substrate (FIG. 18B). After growing an InGaAsP layer 6a on the top surface of the InP substrate 6 until the step from at the above step is filled in, the InGaAsP layer is removed until the surface of the substrate of the non-etched area, i.e., an area where the delay interfering unit 11 is formed (hereinafter, "a delay-interfering-unit forming area") $R_{PC}$ appears (FIG. 18C). Then, the surface of the substrate 6 is planarized. If the surface of the optical-detecting-unit forming area $R_{PD}$ and the delay-interfering-unit forming area $R_{PC}$ are nearly planarized at a time when the growth of the InGaAsP layer 6a is grown on the optical-detecting-unit forming area is completed, it is not necessary to remove the surface of the InGaAsP layer until the surface of the delay-interfering-unit forming area $R_{PC}$ appears.

Figure 18E:
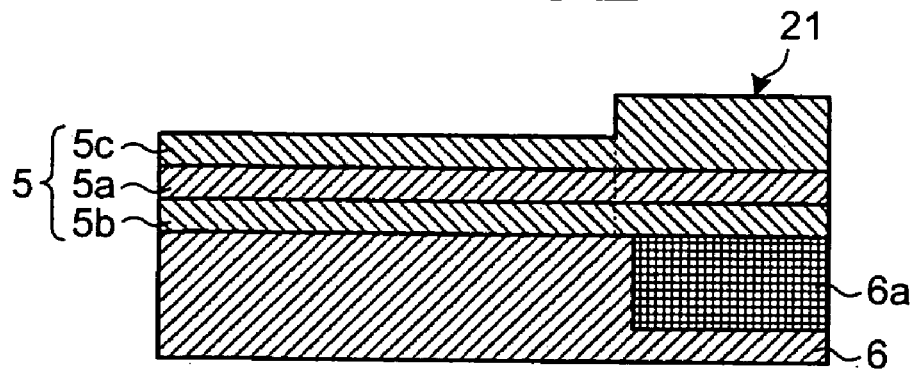
Figure 18F:
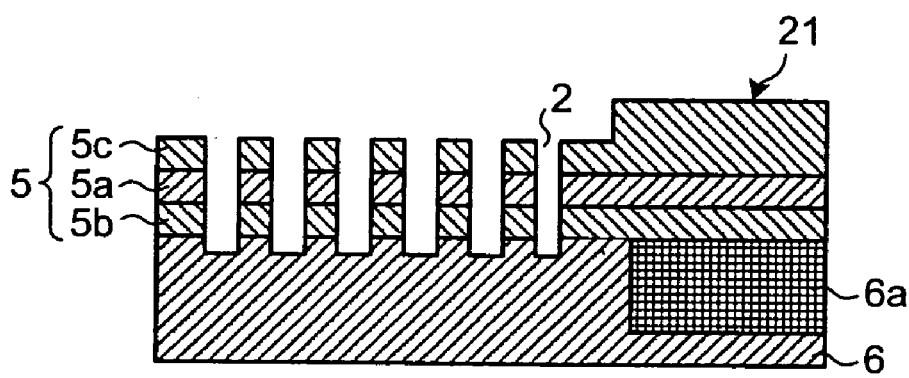

Then, the lower cladding layer 5b, the core layer 5a, and an upper cladding layer 5d that includes a material to become the upper cladding layer 5c of the slab layer 5 formed on the delay-interfering-unit forming area $R^{PC}$, etching-stop layer, and the upper cladding layer to be used to form the waveguide 22 of the optical detecting unit 21 are sequentially formed. The waveguide-type photodetector 22 is formed in the optical detecting unit 21 (FIG. 18D). Furthermore, the upper cladding layer 5d on the delay-interfering-unit forming area $R_{PC}$ is etched by, for example, a wet etching to form the slab layer 5, in such a manner that a thickness of the slab layer 5 on the delay-interfering-unit forming area $R_{PC}$ becomes a sub-micron order (FIG. 18E). After that, the air-hole structure having a line-shaped defect introduced to a periodic structure by a photolithography and an etching according to the first embodiment is formed through the slab layer 5 on the delay-interfering-unit forming area $R_{PC}$ (FIG. 18F).

Figure 18G:
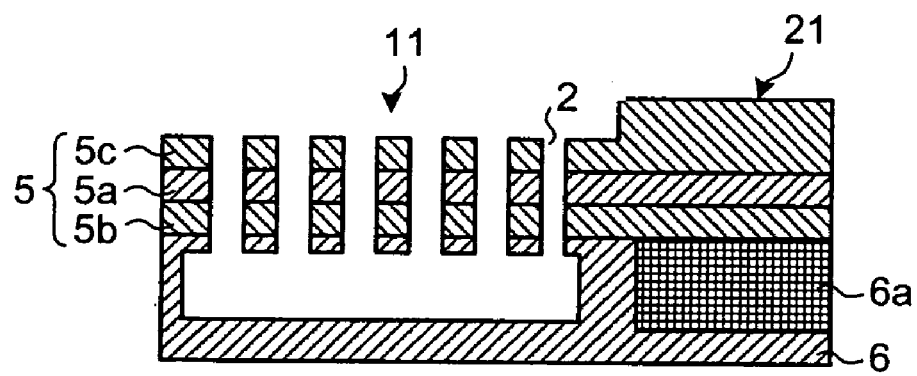
Figure 19:
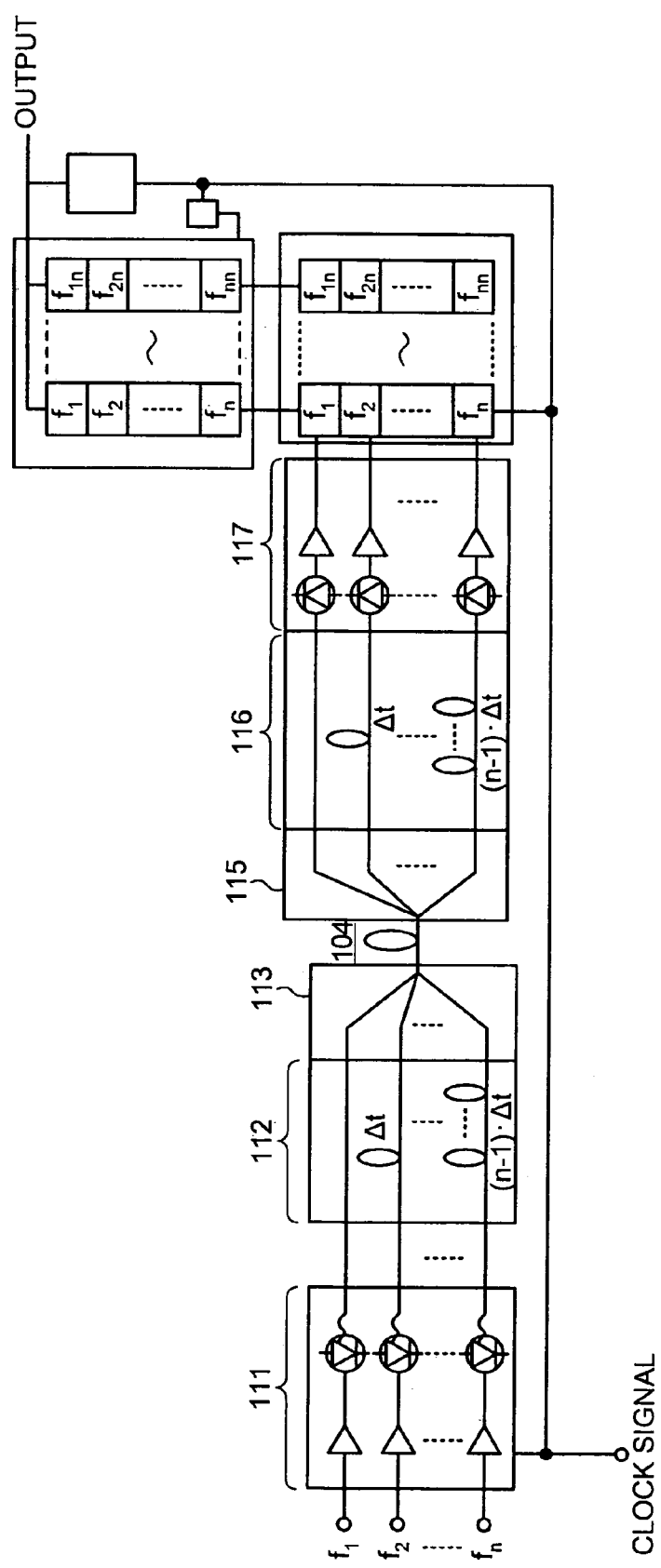
FIG. 19 is a schematic of a conventional optical signal time-division-multiplexed transmission system using an optical delay line.
Figure 20:
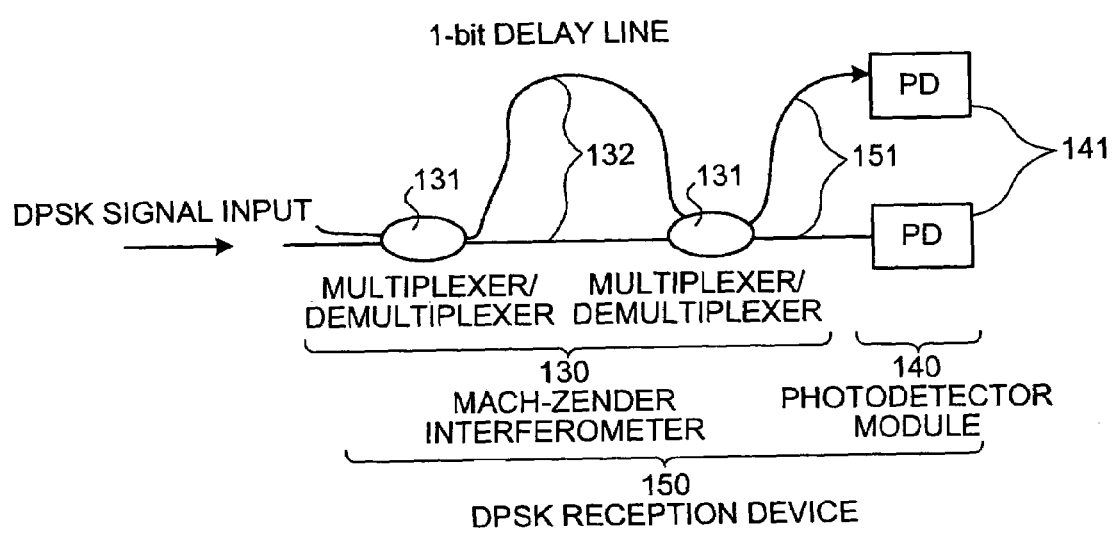
FIG. 20 is a schematic of a conventional DPSK reception device.

Subsequently, a portion of the substrate located under the delay-interfering-unit forming area $R_{PC}$ is removed to form a hollow body (FIG. 18G). For example, because a hydrochloric acid can etch the InP, but cannot etch the InGaAsP, it is possible to etch the portion of the substrate 6 under the delay-interfering-unit forming area $R_{PC}$ to make inside of the substrate 6 hollow, by immersing the integrated optical device in the hydrochloric acid for a predetermined time so that the hydrochloric acid flows into through the air hole 2 formed on the delay interfering unit 11. At this time, because the substrate of the optical-detecting-unit forming area $R_{PD}$ is covered with the InGaAsP layer 6a, it is not etched by the hydrochloric acid, although the InP is partly etched in the lateral direction at a boundary between the InP in the inside of the substrate and the InGaAsP. In this manner, the delay interfering unit 11 and the optical detecting unit 21 can be manufactured in an integrated manner.

As explained above, by forming the thin-film layer with the InGaAsP, and forming the lower substrate with the InP, it is possible to undercut a bottom of the thin-film layer by a wet etching using the hydrochloric acid, and as a result, it is possible to form a slab structure on the delay-interfering-unit forming area $R_{PC}$ only. Because the optical detecting unit 21 is not required to be undercut in the same manner, a vertical boundary wall should be formed to integrally fabricate both the delay interfering unit 11 and the optical detecting unit 21. In addition, the wet etching from above can be prevented by covering a top portion of the optical detecting unit 21 with a mask. In this manner, it is possible to fabricate the delay interfering unit 11 having the photonic crystal structure and the optical detecting unit 21 easily in an integrated manner.

According to the thirteenth embodiment, because the delay interfering unit 11 having the photonic crystal structure and the optical detecting unit 21 having a waveguide-type photodetector is integrally formed on the same substrate, an alignment between the defect waveguides 3a and 3b of the delay interfering unit 11 and the waveguide-type photodetectors 22 of the optical detecting unit 21, which is necessary when the both the delay interfering unit 11 and the optical detecting unit 21 are fabricated separately, is not necessary. Furthermore, because the delay interfering unit 11 and the optical detecting unit 21 are simultaneously formed in the manufacturing process, and the process can be simplified when the both have a common structure, the process becomes smooth, compared to a case in which the both are bonded after being fabricated separately, and as a result, it is possible to manufacture the optical functional device at a low price. Moreover, when InP is use as the substrate, and InGaAsP is used as the thin-film layer, the substrate material under the delay interfering unit 11 can be removed using the hydrochloric acid, leaving the substrate material under the optical detecting unit 21, by making a boundary between the delay interfering unit 11 and the optical detecting unit 21 inside the substrate, to make the delay interfering unit 11 only the thin-film slab structure.

According to the present invention, it is possible to realize a desired optical delay with a compact size. Furthermore, it is possible to obtain stabilization against an environmental variation with an easy control.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical delay circuit comprising:
   first and second defect waveguides having respective portions substantially parallel to each other and separated by a first distance, each of the first and second defect waveguides including a line-shaped defect in a periodic refractive-index distribution structure of a single photonic crystal, wherein the first and second defect waveguides include
      a multiplexing/demultiplexing portion in which first portions of the first and second defect waveguides are closer to each other than the first distance, for multiplexing and demultiplexing light propagating through at least one of the first and second defect waveguides, and
      an optical delay portion extending from the multiplexing/demultiplexing portion and in which the first and second defect waveguides are substantially parallel to each other and separated from each other by the first distance so that light propagating in either of the first and second defect waveguides does not interfere with the light propagating in the other of the first and second defect waveguides.

2. The optical delay circuit according to claim 1, wherein the photonic crystal has a thin-film slab structure including a periodic air-hole structure, and including a dielectric material sandwiching the photonic crystal, the dielectric material having a refractive index lower than that of the photonic crystal.

3. The optical delay circuit according to claim 1, wherein the photonic crystal has a core layer and including cladding layers having a refractive index lower than that of the core layer and sandwiching the core layer.

4. The optical delay circuit according to claim 1, wherein
   the photonic crystal has a thin-film slab structure including a periodic air-hole structure,
   the air-hole structure has a first lattice period in a first area surrounding the optical delay portion in one of the first and second defect waveguides, and
   the air-hole structure has a second lattice period, different from the first lattice period, in a second area of the periodic air-hole structure.

5. The optical delay circuit according to claim 1, wherein
   the photonic crystal has a thin-film slab structure including a periodic air-hole structure,
   air holes of the air-hole structure have a first diameter in a first area of the periodic air-hole surrounding the optical delay portion in one of the first and second defect waveguides, and
   air holes of the air-hole structure have a second diameter, different from the first diameter, in a second area of the periodic air-hole structure.

6. The optical delay circuit according to claim 1, wherein each of the first and second defect waveguides has a different refractive index.

7. The optical delay circuit according to claim 1, wherein one of the first and second defect waveguides has at least one spot defect nearby.

8. The optical delay circuit according to claim 4, including a dielectric material having a refractive index lower than that of the photonic crystal and sandwiching the photonic crystal.

9. The optical delay circuit according to claim 5, including a dielectric material having a refractive index lower than that of the photonic crystal and sandwiching the photonic crystal.

10. The optical delay circuit according to claim 6, including a dielectric material having a refractive index lower than that of the photonic crystal and sandwiching the photonic crystal.

11. The optical delay circuit according to claim 7, including a dielectric material having a refractive index lower than that of the photonic crystal and sandwiching the photonic crystal.

12. The optical delay circuit according to claim 1, wherein widths of the first and second defect waveguides in the multiplexing/demultiplexing portion at an end portion of the optical delay circuit are widened so that coupling efficiency of light input from an external coupling optical system is enhanced.

13. The optical delay circuit according claim 1, wherein the multiplexing/demultiplexing portion is disposed on an end portion of the optical delay circuit so that light input from an external coupling optical system is simultaneously input to the first and second defect waveguides.

14. The optical delay circuit according claim 1, wherein light propagates in a different waveguide mode in each of the first and second defect waveguides.

15. The optical delay circuit according to claim 1, wherein
the photonic crystal has a thin-film slab structure including a periodic air-hole structure, and
the first and second defect waveguides include at least one of:
different widths in the optical delay portion;
different lattice periods of the air-hole structure in an area surrounding the optical delay portion in one of the first and second defect waveguides and in another area of the first and second defect waveguides;
different diameters of an air hole of the air-hole structure in an area surrounding the optical delay portion in one of the first and second defect waveguides and in another area of the first and second defect waveguides; and
different refractive indexes in the first and second defect waveguides.

16. An optical delay circuit comprising:
first and second defect waveguides arranged in parallel to each other, each of the first and second defect waveguides including a line-shaped defect in a periodic refractive-index distribution structure of a single photonic crystal, wherein
the first and second defect waveguides include
a multiplexing/demultiplexing portion in which the defect waveguides for multiplexing and demultiplexing light propagating in at least one of the first and second defect waveguides, and
an optical delay portion; and
each of the first and second defect waveguides has a respective, different width and lies along a straight line.

17. An integrated optical device comprising:
an optical delay circuit having a plurality of defect waveguides arranged in parallel, the defect waveguides including a line-shaped defect in a periodic refractive-index distribution structure of a photonic crystal, each of the defect waveguides including
a multiplexing/demultiplexing portion in which the defect waveguides are arranged close to each other, to multiplex and demultiplex light; and
an optical delay portion extending from the multiplexing/demultiplexing portion, in which the defect waveguides are arranged with a predetermined distance therebetween so that light propagating in any of the defect waveguides does not interfere with light propagating in any other defect waveguide, each of the defect waveguides having a different configuration, the optical delay portion generating a 1-bit optical delay between two of the defect waveguides;
a delay unit including a multiplexing/demultiplexing unit that multiplexes optical signals having a delay and that demultiplexes an interference wave obtained when the optical signals are multiplexed; and
an optical detecting unit including
a waveguide that is connected to the defect waveguides of the delay unit and that propagates light from the defect waveguides; and
a photodetector that detects the light propagated.

18. The integrated optical device according to claim 17, wherein the delay unit and the optical detecting unit are integrated on a single substrate.

19. The integrated optical device according to claim 17, wherein the waveguide has a p-i-n structure.

20. The integrated optical device according to claim 17, wherein the waveguide has a bulk structure having a thickness in a predetermined direction.

21. The integrated optical device according to claim 17, wherein a boundary between an area in which the delay unit is located and an area in which the optical detecting unit is located includes a material having a high resistance to an etching process.

22. A method of manufacturing an integrated optical device having a plurality of defect waveguides, a delay unit, and an optical detecting unit, the defect waveguides including a line-shaped defect in a periodic refractive-index distribution structure of a photonic crystal and being arranged in parallel, the delay unit including a multiplexing/demultiplexing unit on the defect waveguides, the optical detecting unit including a photodetector that is connected to the defect waveguide and detects light from the defect waveguide, the method comprising:
forming a portion with a material having a high resistance to etching on a boundary between an area in which the delay unit is located and an area in which the optical detecting unit is located, on a substrate of a material that is easily etched;
forming the delay unit and the optical detecting unit on the substrate; and
removing a part of the substrate located under the delay unit by etching.

23. An optical delay circuit comprising:
first and second defect waveguides that are parallel to each other, each of the first and second defect waveguides including a line-shaped defect in a periodic refractive-index distribution structure of a single photonic crystal, wherein
the photonic crystal has a thin-film slab structure including a periodic air-hole structure;
the first and second defect waveguides include
a multiplexing/demultiplexing portion for multiplexing and demultiplexing light propagating through at least one of the first and second defect waveguides, and
an optical delay portion extending from the multiplexing/demultiplexing portion;
the air-hole structure has a first lattice period in a first area surrounding the optical delay portion in one of the first and second defect waveguides; and
the air-hole structure has a second lattice period, different from the first lattice period, in a second area of the periodic air-hole structure.

24. An optical delay circuit comprising:
first and second defect waveguides that are parallel to each other, each of the first and second defect waveguides including a line-shaped defect in a periodic refractive-index distribution structure of a single photonic crystal, wherein
the photonic crystal has a thin-film slab structure including a periodic air-hole structure;
the first and second defect waveguides include
a multiplexing/demultiplexing portion for multiplexing and demultiplexing light propagating through at least one of the first and second defect waveguides, and
an optical delay portion extending from the multiplexing/demultiplexing portion;
air holes of the air-hole structure have a first diameter in a first area of the periodic air-hole surrounding the optical delay portion in one of the first and second defect waveguides; and
air holes of the air-hole structure have a second diameter, different from the first diameter, in a second area of the periodic air-hole structure.

25. An optical delay circuit comprising:

first and second defect waveguides that are parallel to each other, each of the first and second defect waveguides including a line-shaped defect in a periodic refractive-index distribution structure of a single photonic crystal wherein the first and second defect waveguides include a multiplexing/demultiplexing portion for multiplexing and demultiplexing light propagating through at least one of the first and second defect waveguides, and an optical delay portion extending from the multiplexing/demultiplexing portion; and the first defect waveguide includes at least one spot defect nearby, the spot defect having a resonance mode so that the light propagating through the first defect waveguide is trapped in the spot defect and is released to the first defect waveguide after a predetermine ed time has passed.

26. The optical delay circuit according to claim 25, wherein the photonic crystal has a thin-film slab structure including a periodic air-hole structure of circular air holes having a diameter, and the spot defect comprises a defect in the air-hole structure selected from the group consisting of an air hole having an elliptical shape in place of one of the circular air holes, a missing air hole in the air-hole structure, and an air hole having a diameter different from the circular air hole of the air-hole structure.

* * * * *